US011889275B2

(12) United States Patent
Usher et al.

(10) Patent No.: US 11,889,275 B2
(45) Date of Patent: Jan. 30, 2024

(54) ACOUSTIC SEALING ANALYSIS SYSTEM

(71) Applicant: Staton Techiya LLC, Delray Beach, FL (US)

(72) Inventors: John Usher, Devon (GB); John P. Keady, Fairfax Station, VA (US)

(73) Assignee: Staton Techiya LLC, Delray Beach, FL (US)

( * ) Notice: Subject to any disclaimer, the term of this patent is extended or adjusted under 35 U.S.C. 154(b) by 0 days.

(21) Appl. No.: 18/092,645

(22) Filed: Jan. 3, 2023

(65) Prior Publication Data

US 2023/0156418 A1 May 18, 2023

Related U.S. Application Data

(60) Continuation of application No. 17/182,570, filed on Feb. 23, 2021, now Pat. No. 11,665,493, which is a continuation of application No. 16/838,277, filed on Apr. 2, 2020, now Pat. No. 10,979,836, which is a continuation of application No. 16/414,136, filed on May 16, 2019, now Pat. No. 10,701,499, which is a continuation of application No. 15/700,511, filed on Sep. 11, 2017, now Pat. No. 10,299,053, which is a continuation of application No. 14/827,332, filed on (Continued)

(51) Int. Cl.

| | |
|---|---|
| ***H04R 29/00*** | (2006.01) |
| ***H04R 1/10*** | (2006.01) |
| ***H04R 25/00*** | (2006.01) |

(52) U.S. Cl.

CPC ......... *H04R 29/001* (2013.01); *H04R 1/1016* (2013.01); *H04R 1/1091* (2013.01); *H04R 25/70* (2013.01); *H04R 29/00* (2013.01); *H04R 2460/07* (2013.01); *H04R 2460/15* (2013.01)

(58) Field of Classification Search

CPC ...... H04R 25/70; H04R 29/001; H04R 29/00; H04R 2460/15; H04R 1/1016; H04R 1/1091; H04R 2460/07

USPC .............................................. 381/58, 59, 60

See application file for complete search history.

(56) References Cited

U.S. PATENT DOCUMENTS

| | | | |
|---|---|---|---|
| 3,876,843 | A | 4/1975 | Moen |
| 4,020,297 | A | 4/1977 | Brodie |

(Continued)

FOREIGN PATENT DOCUMENTS

| | | |
|---|---|---|
| CN | 107071123 | 8/2017 |
| EP | 1385324 | 1/2004 |

(Continued)

OTHER PUBLICATIONS

*Samsung Electronics Co., Ltd., and Samsung Electronics, America, Inc.*, v. *Staton Techiya, LLC*, IPR2022-00282, Dec. 21, 2021.

(Continued)

*Primary Examiner* — Paul Kim

(74) *Attorney, Agent, or Firm* — Akerman LLP; Peter A. Chiabotti

(57) ABSTRACT

A device to test the seal quality of an earpiece. Audio processing circuitry produces an audio signal for driving a speaker. Output from the microphone while the speaker is being driven by the audio signal is used to determine the seal. The device or method further includes control circuitry to evaluate a seal quality of the device. Other embodiments are disclosed.

36 Claims, 15 Drawing Sheets

Related U.S. Application Data

Aug. 17, 2015, now Pat. No. 9,781,530, which is a continuation of application No. 14/054,015, filed on Oct. 15, 2013, now Pat. No. 9,113,267, which is a division of application No. 12/555,864, filed on Sep. 9, 2009, now Pat. No. 8,600,067.

(60) Provisional application No. 61/098,250, filed on Sep. 19, 2008.

(56) References Cited

U.S. PATENT DOCUMENTS 4,054,749 A 10/1977 Suzuki et al.
4,088,849 A 5/1978 Usami et al.
4,947,440 A 8/1990 Bateman et al.
5,002,151 A * 3/1991 Oliveira ............... H04R 25/656 381/328
5,138,722 A 8/1992 Urella
5,142,587 A 8/1992 Kobayashi
5,208,867 A 5/1993 Stites, III
5,251,263 A 10/1993 Andrea
5,267,321 A 11/1993 Langberg
5,276,740 A 1/1994 Inanaga et al.
5,317,273 A 5/1994 Hanson
5,319,163 A 6/1994 Scott
5,327,506 A 7/1994 Stites
5,524,056 A 6/1996 Killion et al.
5,550,923 A 8/1996 Hotvet
5,577,511 A 11/1996 Killion
5,712,453 A 1/1998 Bungardt
5,764,781 A 6/1998 Ding
5,903,868 A 5/1999 Yuen et al.
5,923,624 A 7/1999 Groeger
5,933,510 A 8/1999 Bryant
5,946,050 A 8/1999 Wolff
6,005,525 A 12/1999 Kivela
6,021,207 A 2/2000 Puthuff et al.
6,021,325 A 2/2000 Hall
6,028,514 A 2/2000 Lemelson
6,056,698 A 5/2000 Iseberg
6,118,877 A 9/2000 Lindemann
6,163,338 A 12/2000 Johnson et al.
6,163,508 A 12/2000 Kim et al.
6,226,389 B1 5/2001 Lemelson et al.
6,298,323 B1 10/2001 Kaemmerer
6,321,070 B1 11/2001 Clark
6,359,993 B2 3/2002 Brimhall
6,400,652 B1 6/2002 Goldberg et al.
6,408,272 B1 6/2002 White
6,415,034 B1 7/2002 Hietanen
6,567,524 B1 * 5/2003 Svean ..................... A61F 11/08 381/317
6,606,598 B1 8/2003 Holthouse
6,639,987 B2 10/2003 McIntosh
6,647,368 B2 11/2003 Nemirovski
RE38,351 E 12/2003 Iseberg et al.
6,661,901 B1 12/2003 Svean et al.
6,728,385 B2 4/2004 Kvaloy et al.
6,748,238 B1 6/2004 Lau
6,754,359 B1 6/2004 Svean et al.
6,738,482 B1 9/2004 Jaber
6,804,638 B2 10/2004 Fiedler
6,804,643 B1 10/2004 Kiss
7,003,099 B1 2/2006 Zhang
7,039,195 B1 5/2006 Svean
7,039,585 B2 5/2006 Wilmot
7,050,592 B1 5/2006 Iseberg
7,072,482 B2 7/2006 Van Doorn et al.
7,107,109 B1 9/2006 Nathan et al.
7,158,933 B2 1/2007 Balan
7,177,433 B2 2/2007 Sibbald
7,209,569 B2 4/2007 Boesen
7,280,849 B1 10/2007 Bailey
7,430,299 B2 9/2008 Armstrong et al.
7,433,714 B2 10/2008 Howard et al.
7,444,353 B1 10/2008 Chen
7,450,730 B2 11/2008 Bertg et al.
7,464,029 B2 12/2008 Visser
7,477,756 B2 1/2009 Wickstrom et al.
7,512,245 B2 3/2009 Rasmussen
7,529,379 B2 5/2009 Zurek
7,562,020 B2 7/2009 Le et al.
7,574,917 B2 8/2009 Von Dach
7,688,983 B2 3/2010 Voix
7,756,285 B2 7/2010 Sjursen et al.
7,773,763 B2 8/2010 Pedersen
7,778,434 B2 8/2010 Juneau et al.
7,801,318 B2 9/2010 Bartel
7,853,031 B2 12/2010 Hamacher
7,903,825 B1 3/2011 Melanson
7,903,826 B2 3/2011 Boersma
7,920,557 B2 4/2011 Moote
7,929,713 B2 4/2011 Victorian
7,936,885 B2 5/2011 Frank
7,983,907 B2 7/2011 Visser
3,014,553 A1 9/2011 Radivojevic et al.
8,014,553 B2 9/2011 Radivojevic
8,018,337 B2 9/2011 Jones
3,045,840 A1 10/2011 Murata
8,045,840 B2 10/2011 Murata
8,086,093 B2 12/2011 Stuckman
8,116,489 B2 2/2012 Mejia
8,140,325 B2 3/2012 Kanevsky
8,150,044 B2 4/2012 Goldstein
8,160,261 B2 4/2012 Schulein
8,160,273 B2 4/2012 Visser
8,162,846 B2 4/2012 Epley
8,189,803 B2 5/2012 Bergeron
8,218,784 B2 7/2012 Schulein
8,254,591 B2 8/2012 Goldstein
8,270,629 B2 9/2012 Bothra
8,401,200 B2 3/2013 Tiscareno
8,477,955 B2 7/2013 Engle
8,493,204 B2 7/2013 Wong et al.
8,550,206 B2 10/2013 Keady
8,577,062 B2 11/2013 Goldstein
8,611,560 B2 12/2013 Goldstein
8,625,818 B2 1/2014 Stultz
8,718,305 B2 5/2014 Usher
8,750,295 B2 6/2014 Liron
8,774,433 B2 7/2014 Goldstein
8,774,435 B2 7/2014 Ambrose
8,798,278 B2 8/2014 Isabelle
8,855,343 B2 10/2014 Usher
8,917,894 B2 12/2014 Goldstein
8,971,561 B2 3/2015 Howes et al.
8,983,081 B2 3/2015 Bayley
9,037,458 B2 5/2015 Park et al.
9,053,697 B2 6/2015 Park
9,084,060 B2 7/2015 Liu
9,113,240 B2 8/2015 Ramakrishman
9,123,343 B2 9/2015 Kurki-Suonio
9,135,797 B2 9/2015 Couper et al.
9,191,740 B2 11/2015 McIntosh
9,196,247 B2 11/2015 Harada
9,293,128 B2 3/2016 Goldstein
9,313,572 B2 4/2016 Dusan et al.
9,491,542 B2 11/2016 Usher
9,497,423 B2 11/2016 Moberly
9,628,896 B2 4/2017 Ichimura
10,860,287 B2 12/2020 Konagai
2001/0046304 A1 * 11/2001 Rast ..................... H04R 1/1083 381/26
2002/0076057 A1 6/2002 Voix
2002/0098878 A1 7/2002 Mooney
2002/0106091 A1 8/2002 Furst et al.
2002/0111798 A1 8/2002 Huang
2002/0118798 A1 8/2002 Langhart et al.
2002/0165719 A1 11/2002 Wang
2002/0193130 A1 12/2002 Yang
2003/0033152 A1 2/2003 Cameron
2003/0035551 A1 2/2003 Light
2003/0130016 A1 7/2003 Matsuura
2003/0152359 A1 8/2003 Kim

(56) References Cited

U.S. PATENT DOCUMENTS

| | | | | |
|---|---|---|---|---|
| 2003/0161097 | A1 | 8/2003 | Le et al. | |
| 2003/0165246 | A1 | 9/2003 | Kvaloy et al. | |
| 2003/0165319 | A1 | 9/2003 | Barber | |
| 2003/0198359 | A1 | 10/2003 | Killion | |
| 2004/0042103 | A1 | 3/2004 | Mayer | |
| 2004/0086138 | A1 | 5/2004 | Kuth | |
| 2004/0109579 | A1 | 6/2004 | Izuchi | |
| 2004/0109668 | A1 | 6/2004 | Stuckman | |
| 2004/0125965 | A1 | 7/2004 | Alberth, Jr. et al. | |
| 2004/0133421 | A1 | 7/2004 | Burnett | |
| 2004/0190737 | A1 | 9/2004 | Kuhnel et al. | |
| 2004/0196992 | A1* | 10/2004 | Ryan | H04R 1/10 381/317 |
| 2004/0202340 | A1 | 10/2004 | Armstrong | |
| 2004/0203351 | A1 | 10/2004 | Shearer et al. | |
| 2004/0264938 | A1 | 12/2004 | Felder | |
| 2005/0028212 | A1 | 2/2005 | Laronne | |
| 2005/0058313 | A1 | 3/2005 | Victorian | |
| 2005/0068171 | A1 | 3/2005 | Kelliher | |
| 2005/0071158 | A1 | 3/2005 | Byford | |
| 2005/0078838 | A1 | 4/2005 | Simon | |
| 2005/0096899 | A1* | 5/2005 | Padhi | G10L 15/10 704/216 |
| 2005/0102142 | A1 | 5/2005 | Soufflet | |
| 2005/0123146 | A1 | 6/2005 | Voix et al. | |
| 2005/0207605 | A1 | 9/2005 | Dehe | |
| 2005/0227674 | A1 | 10/2005 | Kopra | |
| 2005/0281422 | A1 | 12/2005 | Armstrong | |
| 2005/0281423 | A1 | 12/2005 | Armstrong | |
| 2005/0283369 | A1 | 12/2005 | Clauser et al. | |
| 2005/0288057 | A1 | 12/2005 | Lai et al. | |
| 2006/0064037 | A1 | 3/2006 | Shalon et al. | |
| 2006/0067551 | A1 | 3/2006 | Cartwright et al. | |
| 2006/0083387 | A1 | 4/2006 | Emoto | |
| 2006/0083390 | A1 | 4/2006 | Kaderavek | |
| 2006/0083395 | A1 | 4/2006 | Allen et al. | |
| 2006/0092043 | A1 | 5/2006 | Lagassey | |
| 2006/0140425 | A1 | 6/2006 | Berg | |
| 2006/0167687 | A1 | 7/2006 | Kates | |
| 2006/0173563 | A1 | 8/2006 | Borovitski | |
| 2006/0182287 | A1 | 8/2006 | Schulein | |
| 2006/0188075 | A1 | 8/2006 | Peterson | |
| 2006/0188105 | A1 | 8/2006 | Baskerville et al. | |
| 2006/0195322 | A1 | 8/2006 | Broussard et al. | |
| 2006/0204014 | A1 | 9/2006 | Iseberg et al. | |
| 2006/0264176 | A1 | 11/2006 | Hong | |
| 2006/0287014 | A1 | 12/2006 | Matsuura | |
| 2007/0003090 | A1 | 1/2007 | Anderson | |
| 2007/0019817 | A1* | 1/2007 | Siltmann | H04R 25/305 381/60 |
| 2007/0021958 | A1 | 1/2007 | Visser et al. | |
| 2007/0036377 | A1 | 2/2007 | Stirnemann | |
| 2007/0043563 | A1 | 2/2007 | Comerford et al. | |
| 2007/0014423 | A1 | 4/2007 | Darbut | |
| 2007/0086600 | A1 | 4/2007 | Boesen | |
| 2007/0092087 | A1 | 4/2007 | Bothra | |
| 2007/0100637 | A1 | 5/2007 | McCune | |
| 2007/0143820 | A1 | 6/2007 | Pawlowski | |
| 2007/0160243 | A1 | 7/2007 | Dijkstra | |
| 2007/0189544 | A1 | 8/2007 | Rosenberg | |
| 2007/0223717 | A1 | 9/2007 | Boersma | |
| 2007/0253569 | A1 | 11/2007 | Bose | |
| 2007/0255435 | A1 | 11/2007 | Cohen | |
| 2007/0291953 | A1 | 12/2007 | Ngia et al. | |
| 2008/0037801 | A1 | 2/2008 | Alves et al. | |
| 2008/0063228 | A1 | 3/2008 | Mejia | |
| 2008/0130908 | A1 | 6/2008 | Cohen | |
| 2008/0137873 | A1 | 6/2008 | Goldstein | |
| 2008/0145032 | A1 | 6/2008 | Lindroos | |
| 2008/0159547 | A1 | 7/2008 | Schuler | |
| 2008/0165988 | A1 | 7/2008 | Terlizzi et al. | |
| 2008/0221880 | A1 | 9/2008 | Cerra et al. | |
| 2009/0010456 | A1 | 1/2009 | Goldstein et al. | |
| 2009/0024234 | A1 | 1/2009 | Archibald | |
| 2009/0076821 | A1 | 3/2009 | Brenner | |
| 2009/0122996 | A1 | 5/2009 | Klein | |
| 2009/0286515 | A1 | 5/2009 | Othmer | |
| 2010/0061564 | A1 | 3/2010 | Clemow et al. | |
| 2010/0119077 | A1 | 5/2010 | Platz | |
| 2010/0296668 | A1 | 11/2010 | Lee et al. | |
| 2010/0328224 | A1 | 12/2010 | Kerr et al. | |
| 2011/0055256 | A1 | 3/2011 | Phillips | |
| 2011/0096939 | A1 | 4/2011 | Ichimura | |
| 2011/0116643 | A1 | 5/2011 | Tiscareno | |
| 2011/0187640 | A1 | 8/2011 | Jacobsen et al. | |
| 2011/0264447 | A1 | 10/2011 | Visser et al. | |
| 2011/0293103 | A1 | 12/2011 | Park et al. | |
| 2012/0170412 | A1 | 7/2012 | Calhoun | |
| 2013/0177179 | A1 | 7/2013 | Ambrose | |
| 2014/0023203 | A1 | 1/2014 | Rotschild | |
| 2014/0122092 | A1 | 5/2014 | Goldstein | |
| 2014/0163976 | A1 | 6/2014 | Park | |
| 2014/0247948 | A1 | 9/2014 | Goldstein | |
| 2014/0247952 | A1 | 9/2014 | Goldstein | |
| 2015/0215701 | A1 | 7/2015 | Usher | |
| 2016/0058378 | A1 | 3/2016 | Wisby et al. | |
| 2016/0104452 | A1 | 4/2016 | Guan et al. | |
| 2018/0176681 | A1 | 6/2018 | Asada | |

FOREIGN PATENT DOCUMENTS

| | | |
|---|---|---|
| EP | 1401240 | 3/2004 |
| EP | 1519625 | 3/2005 |
| EP | 1640972 | 3/2006 |
| JP | H0877468 | 3/1996 |
| JP | H10162283 | 6/1998 |
| JP | 3353701 | 12/2002 |
| WO | WO9326085 | 12/1993 |
| WO | WO2004114722 | 12/2004 |
| WO | WO2006037156 | 4/2006 |
| WO | 2006054698 | 5/2006 |
| WO | WO2007092660 | 8/2007 |
| WO | WO2008050583 | 5/2008 |
| WO | 2009023784 | 2/2009 |
| WO | 2012097150 | 7/2012 |

OTHER PUBLICATIONS

*Samsung Electronics Co., Ltd., and Samsung Electronics, America, Inc.,* v. *Staton Techiya, LLC*, IPR2022-00242, Dec. 23, 2021.

*Samsung Electronics Co., Ltd., and Samsung Electronics, America, Inc.,* v. *Staton Techiya, LLC*, IPR2022-00243, Dec. 23, 2021.

*Samsung Electronics Co., Ltd., and Samsung Electronics, America, Inc.,* v. *Staton Techiya, LLC*, IPR2022-00234, Dec. 21, 2021.

*Samsung Electronics Co., Ltd., and Samsung Electronics, America, Inc.,* v. *Staton Techiya, LLC*, IPR2022-00253, Jan. 18, 2022.

*Samsung Electronics Co., Ltd., and Samsung Electronics, America, Inc.,* v. *Staton Techiya, LLC*, IPR2022-00324, Jan. 13, 2022.

*Samsung Electronics Co., Ltd., and Samsung Electronics, America, Inc.,* v. *Staton Techiya, LLC*, IPR2022-00281, Jan. 18, 2022.

*Samsung Electronics Co., Ltd., and Samsung Electronics, America, Inc.,* v. *Staton Techiya, LLC*, IPR2022-00302, Jan. 13, 2022.

*Samsung Electronics Co., Ltd., and Samsung Electronics, America, Inc.,* v. *Staton Techiya, LLC*, IPR2022-00369, Feb. 18, 2022.

*Samsung Electronics Co., Ltd., and Samsung Electronics, America, Inc.,* v. *Staton Techiya, LLC*, IPR2022-00388, Feb. 18, 2022.

*Samsung Electronics Co., Ltd., and Samsung Electronics, America, Inc.,* v. *Staton Techiya, LLC*, IPR2022-00410, Feb. 18, 2022.

*Samsung Electronics Co., Ltd., and Samsung Electronics, America, Inc.,* v. *Staton Techiya, LLC*, IPR2022-01078, Jun. 9, 2022.

*Samsung Electronics Co., Ltd., and Samsung Electronics, America, Inc.,* v. *Staton Techiya, LLC*, IPR2022-01099, Jun. 9, 2022.

*Samsung Electronics Co., Ltd., and Samsung Electronics, America, Inc.,* v. *Staton Techiya, LLC*, IPR2022-01106, Jun. 9, 2022.

*Samsung Electronics Co., Ltd., and Samsung Electronics, America, Inc.,* v. *Staton Techiya, LLC*, IPR2022-01098, Jun. 9, 2022.

U.S. Appl. No. 90/015,146, Samsung Electronics Co., Ltd. and Samsung Electronics, America, Inc., Request for Ex Parte Reexamination of U.S. Pat. No. 10,979,836.

(56) References Cited

OTHER PUBLICATIONS

Ronald M. Aarts, Roy Irwan, and Augustus J. E.. Janssen, Efficient Tracking of the Cross-Correlation Coefficient, IEEE Transactions on Speech and Audio Processing, vol. 10, No. 6, Sep. 2002, pp. 391-402.

Robert Oshana, DSP Software Development Techniques for Embedded and Real-Time Systems, Embedded Technology Series, Elsevier Inc., 2006, ISBN-10: 0-7506-7759-7, 95 pages.

Olwal, A. and Feiner S. Interaction Techniques Using Prosodic Features of Speech and Audio Localization. Proceedings of IUI 2005 (International Conference on Intelligent User Interfaces), San Diego, CA, Jan. 9-12, 2005, p. 284-286.

Bernard Widrow, John R. Glover Jr., John M. McCool, John Kaunitz, Charles S. Williams, Robert H. Hearn, James R. Zeidler, Eugene Dong Jr, and Robert C. Goodlin, Adaptive Noise Cancelling: Principles and Applications, Proceedings of the IEEE, vol. 63, No. 12, Dec. 1975, pp. 1692-1701.

Mauro Dentino, John M. McCool, and Bernard Widrow, Adaptive Filtering in the Frequency Domain, Proceedings of the IEEE, vol. 66, No. 12, Dec. 1978, pp. 1658-1659.

* cited by examiner

ACOUSTIC SEALING ANALYSIS SYSTEM

CROSS-REFERENCE TO RELATED APPLICATIONS

This application is a continuation of U.S. patent application Ser. No. 17/182,570, filed 23 Feb. 2021, which is a continuation of U.S. patent application Ser. No. 16/838,277, filed Apr. 2, 2020, which is a continuation of U.S. patent application Ser. No. 16/414,136, filed May 16, 2019, which is a continuation of U.S. patent application Ser. No. 15/700,511, filed Sep. 11, 2017, which is a continuation of U.S. patent application Ser. No. 14/827,332, filed Aug. 17, 2015, now U.S. Pat. No. 9,781,530, which is a continuation of U.S. patent application Ser. No. 14/054,015, filed Oct. 15, 2013, now U.S. Pat. No. 9,113,267, which is a Divisional Application of U.S. application Ser. No. 12/555,864, filed Sep. 9, 2009, now U.S. Pat. No. 8,600,067 and claims the benefit of U.S. Provisional Patent Application No. 61/098,250 filed Sep. 19, 2008. The disclosure of all the aforementioned references are incorporated herein by reference in their entirety.

FIELD OF THE INVENTION

The present invention relates to testing the seal of an orifice-inserted device, and more particularly, though not exclusively, to a device and method for determining if an earpiece is sealed correctly in an ear canal.

BACKGROUND OF THE INVENTION

It can be difficult to communicate using an earpiece or earphone device in the presence of high-level background sounds. In many earpiece designs a transducer is placed near the ear canal opening. Ambient sound from the surrounding environment enters the ear canal with the audio content from the transducer. Environmental sounds such as traffic, construction, and nearby conversations can degrade the quality of the audio content.

Although audio processing technologies can adequately suppress noise, the earpiece is generally sound agnostic and cannot differentiate sounds. Thus, one method to prevent ambient sound from entering the ear is to seal or provide an acoustic barrier at the opening of the ear canal. Sealing minimizes ambient sound leakage into the ear canal, and under the correct conditions can provide a level of noise suppression under high background noise conditions. Certain types of acoustic software (e.g., communication in a noisy environment via an ear canal microphone) may require some minimum noise isolation from the ambient sound to provide adequate performance to the user. Additionally, user conditions may change substantially during the operation of the earpiece, and in some circumstances, the earpiece may become misaligned or may be fit incorrectly such that it is not sealed correctly. A method of seal detection is needed to optimize performance.

SUMMARY OF THE INVENTION

Broadly stated, embodiments are directed to a device and method to determine if an earpiece is sealing within the design specification of the device.

In one embodiment, the device can include a sealing section forming an acoustic barrier between a first volume and a second volume. An ear canal receiver (ECR) can be configured to generate an acoustic signal in the first volume.

An Ear Canal Microphone (ECM) in the first volume can be configured to measure the acoustic signal in the first volume. The first acoustic signal emitted by the ECR can be cross-correlated with the first acoustic signal detected with the ECM to determine if the sealing section is sealed properly.

At least one exemplary embodiment is directed to a method of detecting sealing integrity of an earpiece comprising the steps of: providing a test signal; generating an acoustic signal corresponding to the test signal incident on an ear canal side of a sealing section; converting the acoustic signal incident on a first side of the sealing section to an electrical signal; and cross-correlating the test signal to the electrical signal where the earpiece is sealed correctly when a cross-correlation between the test signal and the electrical signal is above a threshold.

At least one exemplary embodiment is directed to a method of adjusting attenuation of an earpiece comprising the steps of: relating cross-correlation of a test signal and a measured acoustic signal in an ear canal of a user to an attenuation level of a sealing section of the earpiece; comparing the attenuation level of the sealing section of the earpiece to a minimum attenuation value; and adjusting a pressure of the sealing section to meet the minimum attenuation value.

At least one exemplary embodiment is directed to a device comprising: a sealing section configured to seal a user's orifice, where the sealing section is configured to produce an acoustic seal between a first side of the sealing section and a second side of the sealing section; a transducer configured to generate a first acoustic signal incident on the first side of the sealing section; and a first microphone configured to measure a second acoustic signal incident on the second side of the sealing section, where the second acoustic signal includes at least a portion of the first acoustic signal that has passed from the first side to the second side of the sealing section where the first acoustic signal is compared to the second acoustic signal to determine if the sealing section is sealed.

Further areas of applicability of exemplary embodiments of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION

Figure 1:
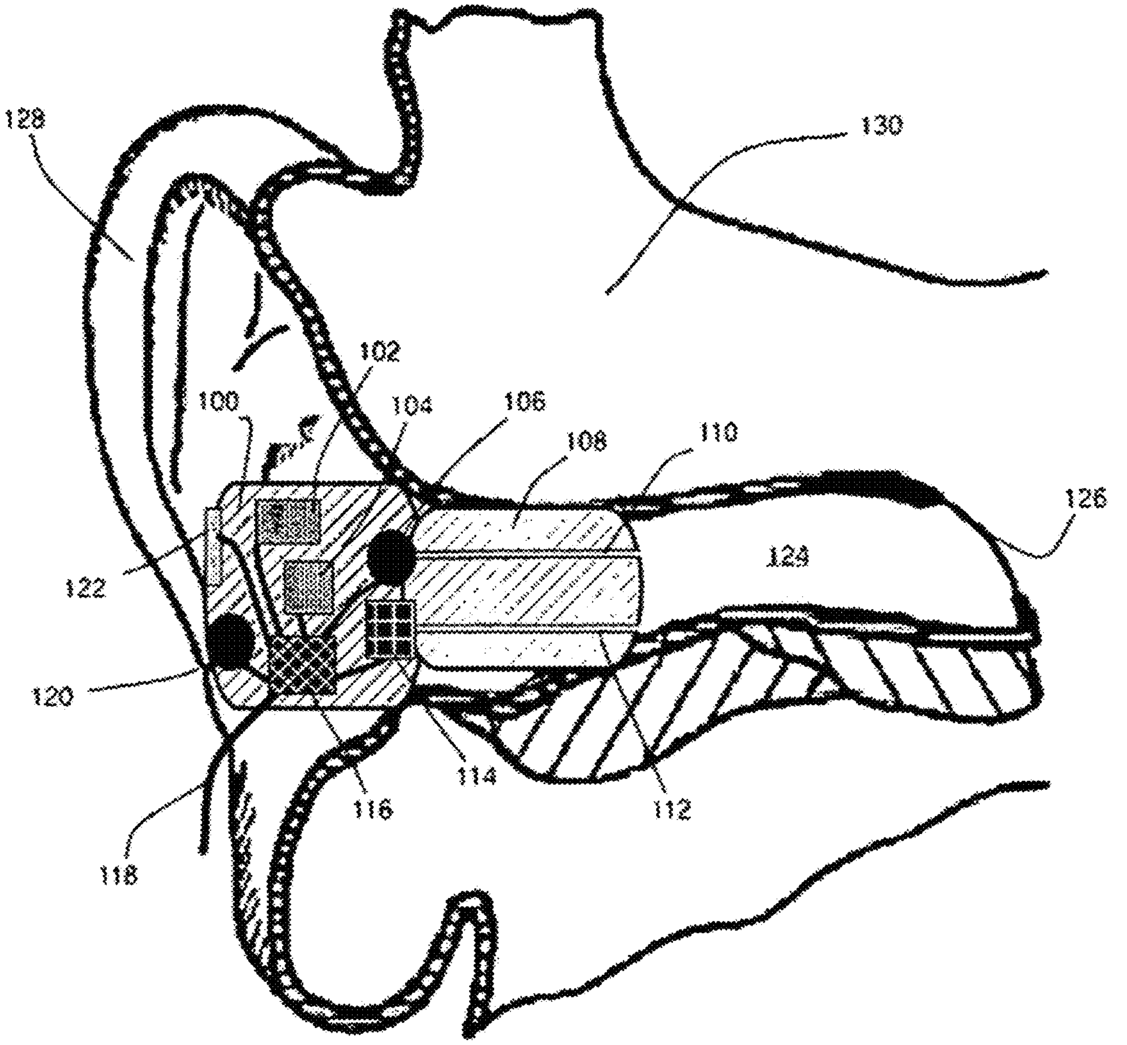
FIG. 1 is a diagram of an earpiece inserted in an ear canal in accordance with an exemplary embodiment.

The following description of exemplary embodiment(s) is merely illustrative in nature and is in no way intended to limit the invention, its application, or uses.

Exemplary embodiments are directed to or can be operatively used on various wired or wireless orifice inserted devices for example earpiece devices (e.g., earbuds, headphones, ear terminals, behind the ear devices or other acoustic devices as known by one of ordinary skill, and equivalents).

Processes, techniques, apparatus, and materials as known by one of ordinary skill in the art may not be discussed in detail but are intended to be part of the enabling description where appropriate. For example specific computer code may not be listed for achieving each of the steps discussed, however one of ordinary skill would be able, without undo experimentation, to write such code given the enabling disclosure herein. Such code is intended to fall within the scope of at least one exemplary embodiment.

Additionally exemplary embodiments are not limited to earpieces, for example some functionality can be implemented on other systems with speakers and/or microphones for example computer systems, PDAs, BlackBerry® smart phones, cell and mobile phones, and any other device that emits or measures acoustic energy. Additionally, exemplary embodiments can be used with digital and non-digital acoustic systems. Additionally various receivers and microphones can be used, for example MEMs transducers, diaphragm transducers, for example Knowles' FG and EG series transducers.

Notice that similar reference numerals and letters refer to similar items in the following figures, and thus once an item is defined in one figure, it may not be discussed or further defined in the following figures.

In all of the examples illustrated and discussed herein, any specific values, for example the sound pressure level change, should be interpreted to be illustrative only and non-limiting. Thus, other examples of the exemplary embodiments could have different values.

Note that herein when referring to correcting or preventing an error or damage (e.g., hearing damage), a reduction of the damage or error and/or a correction of the damage or error are intended.

At least one exemplary embodiment of the invention is directed to an earpiece for sealing or partially sealing an ear. FIG. 1 is a diagram of an earpiece inserted in an ear canal 124 in accordance with at least one exemplary embodiment of the invention. FIG. 1 also illustrates portions of the ear including pinna 128, ear canal 124 and eardrum 126. As illustrated, the earpiece comprises an electronic housing unit 100 and a sealing unit 108. The earpiece depicts an electro-acoustical assembly for an in-the-ear acoustic assembly, as it would typically be placed in an ear canal 124 of a user 130. The earpiece is an in-ear earpiece, behind the ear earpiece, receiver in the ear, partial-fit device, or any other suitable earpiece type. The earpiece can partially or fully occlude the ear canal 124.

The earpiece includes an Ambient Sound Microphone (ASM) 120 to capture ambient sound, an Ear Canal Receiver (ECR) 114 to deliver audio to an ear canal 124, and an Ear Canal Microphone (ECM) 106 to capture and assess a sound exposure level within the ear canal 124. The earpiece can partially or fully occlude the ear canal 124 to provide various degrees of acoustic isolation. The assembly is designed to be inserted into the user's ear canal 124, and to form an acoustic seal with the walls of the ear canal 124 at a location between the entrance to the ear canal 124 and the tympanic membrane (or ear drum) 126. In general, such a seal is typically achieved by means of a soft and compliant housing of the sealing unit 108. Additionally, the sealing unit 108 can be a pressurized expandable element that fills a portion of the available local space.

Sealing unit 108 is an acoustic barrier having a first side corresponding to ear canal 124 and a second side corresponding to the ambient environment. In at least one exemplary embodiment, sealing unit 108 includes an ear canal microphone tube 110 and an ear canal receiver tube 112. Sealing unit 108 creates a closed cavity of approximately 5 cc or less between the first side of sealing unit 108 and the tympanic membrane 126 in ear canal 124. In at least one exemplary embodiment the sealing facilitates using the ECR (speaker) 114 to generate a full range bass response when reproducing sounds for the user. This seal also serves to significantly reduce the sound pressure level at the user's eardrum 126 resulting from the sound field at the entrance to the ear canal 124. This seal is also a basis for a sound isolating performance of the electro-acoustic assembly.

In at least one exemplary embodiment and in broader context, the second side of sealing unit 108 corresponds to the side adjacent to electronic housing unit 100. Ambient sound microphone 120 is housed in electronic housing unit 100 and is exposed to the ambient environment for receiving sound from the ambient environment around the user.

The electronic housing unit 100 can include various system components such as a microprocessor 116, memory 104, battery 102, ECM 106, ASM 120, ECR, 114, and user interface 122, or these components can reside in a separate system or interface operatively connected. Microprocessor 116 (or processor 116) can be a logic circuit, a digital signal processor, controller, or the like for performing calculations and operations for the earpiece. Microprocessor 116 is operatively coupled to memory 104, ECM 106, ASM 120, ECR 114, and user interface 122. An optional wire 118 can provide an external connection to the earpiece. Battery 102 powers the circuits and transducers of the earpiece. Battery 102 can be a rechargeable or replaceable battery.

In at least one exemplary embodiment, electronic housing unit 100 is adjacent to sealing unit 108. Openings in electronic housing unit 100 receive ECM tube 110 and ECR tube 112 to respectively couple to ECM 106 and ECR 114. ECR tube 112 and ECM tube 110 acoustically couple signals to and from ear canal 124. For example, ECR 114 outputs an acoustic signal through ECR tube 112 and into ear canal 124 where it is received by the tympanic membrane 126 of the user of the earpiece. Conversely, ECM 106 receives an acoustic signal present in ear canal 124 though ECM tube 110.

One function of ECM 106 is that of measuring the sound pressure level in the ear canal cavity 124 as a part of testing the hearing acuity of the user as well as confirming the integrity of the acoustic seal and the working condition of the earpiece. In one arrangement, ASM 120 is used to monitor sound pressure at the entrance to the occluded or partially occluded ear canal 124. All transducers shown can receive or transmit audio signals to a processor 116 that undertakes audio signal processing and provides a transceiver for audio via the wired (wire 118) or a wireless communication path. Note also that the acoustic signals can be stored for later retrieval.

In at least one exemplary embodiment the earpiece can be constructed to actively monitor a sound pressure level both inside and outside an ear canal 124. In at least one exemplary embodiment monitored data can be used to enhance spatial and timbral sound quality while maintaining supervision to ensure safe sound reproduction levels. In at least one exemplary embodiment an earpiece can facilitate at least one of conducting listening tests, filtering sounds in the environment, monitoring warning sounds in the environment, presenting notification based on identified warning sounds, maintaining constant audio content to ambient sound levels, and filtering sound in accordance with a Personalized Hearing Level (PHL).

The earpiece can generate an Ear Canal Transfer Function (ECTF) to model the ear canal 124 using ECR 114 and ECM 106, as well as an Outer Ear Canal Transfer function (OETF) using ASM 120. For instance, the ECR 114 can deliver an impulse within the ear canal 124 and generate the ECTF via cross correlation of the impulse with the impulse response of the ear canal 124. The earpiece can also determine a sealing profile with the user's ear to compensate for any leakage. In at least one exemplary embodiment the earpiece can use either the ASM 120 or the ECM 106 to monitor the sound pressure level, which can then be used in a Sound Pressure Level Dosimeter calculation, to estimate sound exposure and recovery times. This permits the earpiece to safely administer and monitor sound exposure to the ear.

Figure 2:
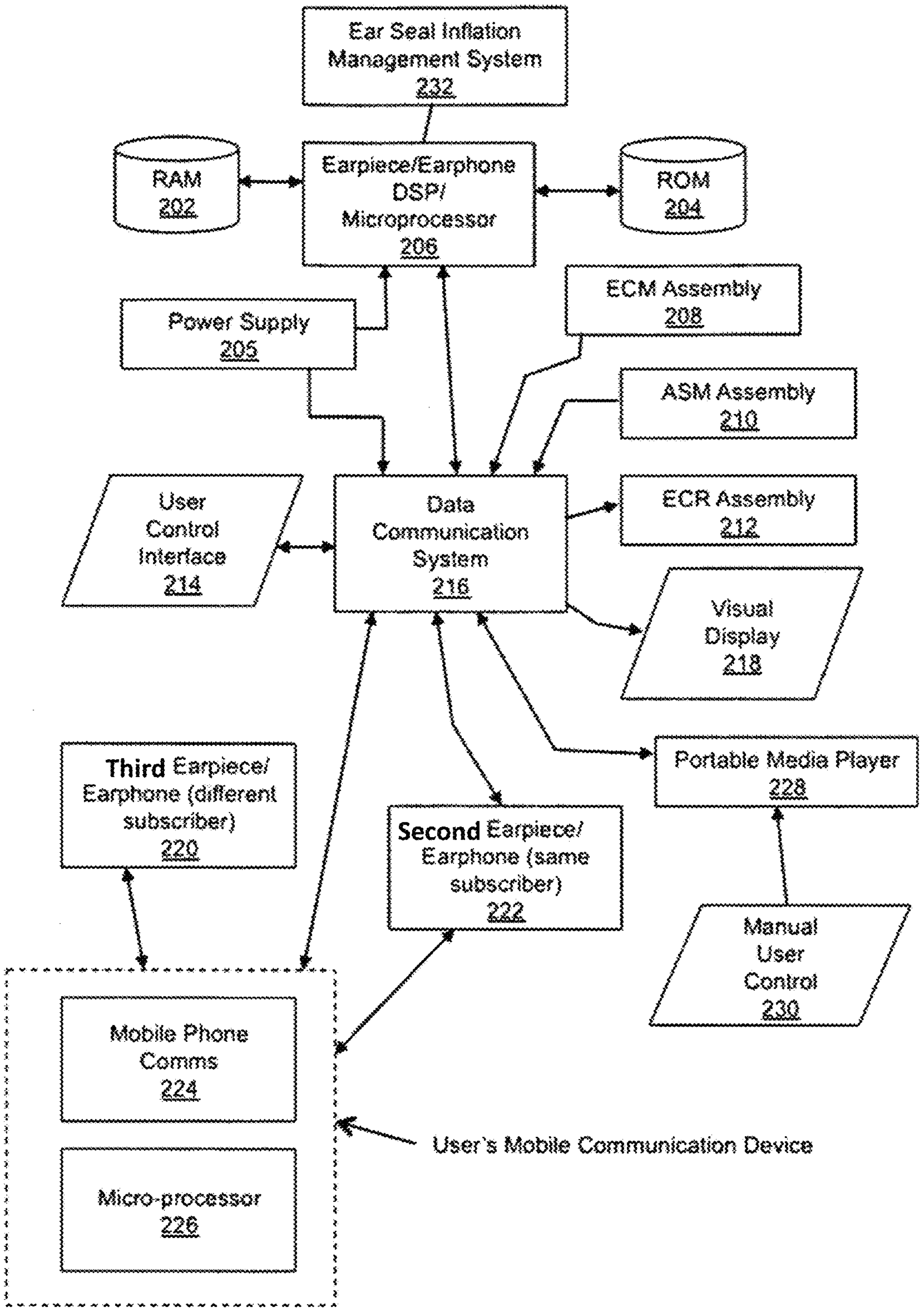
FIG. 2 is a block diagram of optional components of an earpiece in accordance with an exemplary embodiment.

Referring to FIG. 2, a block diagram of an earpiece 201 in accordance with an exemplary embodiment is shown. A power supply 205 (e.g., USB power connection, hearing aid battery (batteries)) powers components of the earpiece 201 including microprocessor 206 (or processor 206, e.g., Texas Instruments TMS320C6713) and a data communication system 216 (e.g., RF or Bluetooth communication chip). As illustrated, the earpiece 201 includes the processor 206 operatively coupled to data communication system 216, ASM 210, ECR 212, and ECM 208. Data communication system 216 may include one or more Analog to Digital Converters and Digital to Analog Converters (DAC). The processor 206 can utilize computing technologies such as a microprocessor, Application Specific Integrated Chip (ASIC), and/or digital signal processor (DSP) with associated Random Access Memory (RAM) 202 and Read Only Memory (ROM) 204. Other memory types such as Flash, non-volatile memory, SRAM, DRAM or other like technologies can be used for storage with processor 206. The processor 206 can also include a clock to record a time stamp.

In general, data communication system 216 is a communication pathway to components of the earpiece 201 and components external to the earpiece 201. The communication link can be wired or wireless. In at least one exemplary embodiment, data communication system 216 is configured to communicate with ECM 208, ASM 210, visual display 218, and user control interface 214 of the earpiece 201. As shown, user control interface 214 can be wired or wirelessly connected. In at least one exemplary embodiment, data communication system 216 is capable of communication to devices exterior to the earpiece 201 such as the user's mobile phone 234, a second earpiece 222, and a portable media player 228. Portable media player 228 can be controlled by a manual user control 230.

The user's mobile phone 234 includes a mobile phone communication system 224. A microprocessor 226 is operatively coupled to mobile phone communication system 224. As illustrated multiple devices can be wirelessly connected to one another such as an earpiece 220 worn by another person to the user's mobile phone. Similarly, the user's mobile phone 234 can be connected to the data communication system 216 of the earpiece 201 as well as the second earpiece 222. This connection would allow one or more people to listen and respond to a call on the user's mobile phone 234 through their respective earpieces.

As illustrated, a data communication system 216 can include a voice operated control (VOX) module to provide voice control to one or more subsystems, such as a voice recognition system, a voice dictation system, a voice recorder, or any other voice related processor. The VOX module can also serve as a switch to indicate to the subsystem a presence of spoken voice and a voice activity level of the spoken voice. The VOX can be a hardware component implemented by discrete or analog electronic components or a software component. In one arrangement, the processor 206 can provide functionality of the VOX by way of software, such as program code, assembly language, or machine language.

The RAM 202 stores program instructions for execution on the processor 206 as well as captured audio processing data. For instance, memory RAM 202 and ROM 204 can be off-chip and external to the processor 206 and include a data buffer to temporarily capture the ambient sound and the internal sound, and a storage memory to save from the data buffer the recent portion of the history in a compressed format responsive to a directive by the processor. In at least one exemplary embodiment, the data buffer can be a circular buffer that temporarily stores audio sound at a current time point to a previous time point. It should also be noted that the data buffer is operatively connected with processor 206 to provide high speed data access. The storage memory can be non-volatile memory such as SRAM to store captured or compressed audio data.

Data communication system 216 includes an audio interface operatively coupled to the processor 206 and the VOX to receive audio content, for example from portable media player 228, a cell phone, or any other communication device, and deliver the audio content to the processor 206. The processor 206 responsive to detecting voice-operated events from the VOX can adjust the audio content delivered to the ear canal of the user of the earpiece. For instance, the processor 206 (or the VOX of data communication system 216) can lower a volume of the audio content responsive to detecting an event for transmitting the acute sound to the ear canal of the user. The processor 206 by way of the ECM 208 can also actively monitor the sound exposure level inside the ear canal and adjust the audio to within a safe and subjectively optimized listening level range based on voice operating decisions made by the VOX of data communication system 216.

The earpiece 201 and data communication system 216 can further include a transceiver that can support singly or in combination any number of wireless access technologies including without limitation Bluetooth™, Wireless Fidelity (WiFi), Worldwide Interoperability for Microwave Access (WiMAX), and/or other short or long range communication protocols. The transceiver can also provide support for dynamic downloading over-the-air to the earpiece 201. It should be noted also that next generation access technologies can also be used in exemplary embodiments.

Data communication system 216 can also include a location receiver that utilizes common technology such as a common GPS (Global Positioning System) receiver that can intercept satellite signals and therefrom determine a location fix of the earpiece 201.

The power supply 205 utilizes common power management technologies such as replaceable batteries, supply regulation technologies, and charging system technologies for supplying energy to the components of the earpiece 201 and to facilitate portable applications. A motor (not shown) can be a single supply motor driver coupled to the power supply 205 to improve sensory input via haptic vibration. As an example, the processor 206 can direct the motor to vibrate responsive to an action, such as a detection of a warning sound or an incoming voice call.

Microprocessor 206 is operatively connected with an EarSeal Inflation Management System 232 to control the degree to which the sealing unit 108 is inflated or deflated. In one exemplary embodiment, sealing unit 108 comprises an expandable element (e.g., inflatable balloon mechanism), whereby a cavity can be filled with air or a liquid to change the degree of acoustic isolation between the internal ear canal space 124 and the ambient environment. Alternately, a passive system for sealing ear canal 124 is used such as a flexible rubber or a silicon sealing unit or a foam plug. In one exemplary embodiment, the passive system is a balloon mechanism that is filled with air or liquid. The balloon mechanism conforms to the shape and size of an ear canal and includes a restorative force module that applies a pressure to the balloon mechanism for sealing the ear canal cavity.

The earpiece is a single operational device or a family of devices configured in a master-slave arrangement, for example, a mobile device and an earpiece. In the latter embodiment, the components of the earpiece are reused in different form factors for the master and slave devices.

Figure 3:
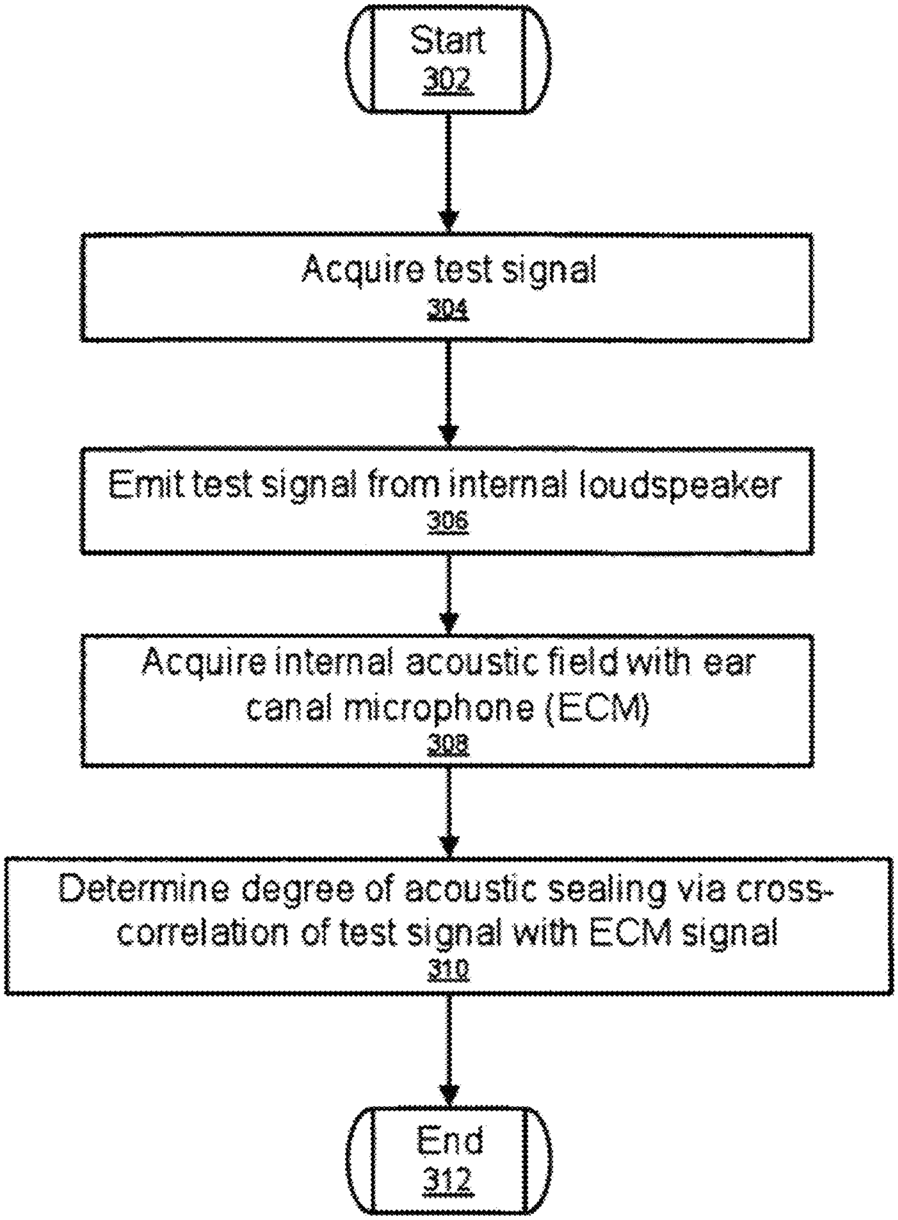
FIG. 3 is a flowchart of a method for checking an ear seal in accordance with an exemplary embodiment.

Referring to FIG. 3, a flowchart illustrates a method for an acoustic sealing analysis system in accordance with an exemplary embodiment. In general, a first volume is acoustically isolated from a second volume. The test determines if the two volumes have sufficient acoustic isolation from one another. For example, cars are designed to have a quiet interior. Users of an automobile do not want to be subjected to the noise of the external environment. Thus, a car interior (first volume) is acoustically isolated from the external environment outside of the automobile. Similarly, an earpiece having a sealing unit such as described in FIG. 1 will create a first volume (the ear canal) that is acoustically isolated from the ambient environment of the user (second volume). In either example, the acoustic sealing analysis system determines if there is sufficient acoustic isolation for the application. In the earpiece example, random or periodic testing of the seal may be beneficial because a new seal is formed in the ear canal when the device is put in the ear or it may shift over time depending on user activity.

The method begins at step 302. A test signal is acquired in a step 304. For example, the test signal can be stored in memory or generated by a microprocessor. The test signal is provided to the acoustic transducer. The acoustic transducer or loudspeaker (such as an ECR) emits an acoustic signal corresponding to the test signal within the first volume in a step 306. The acoustic field in the first volume is detected by an Ear Canal Microphone (ECM) in a step 308. The acoustic loading on both the ECR and ECM will change depending on the degree of acoustic sealing, thereby affecting the degree magnitude of the radiated ECR signal detected by the ECM. In general, as the degree of ear seal decreases, the effect of lumped air mass coupled to the ECR and ECM will decrease thereby increasing in Thevenin capacitance, which effectively reduces the transfer of low frequency emitted sound from the ECR to the ECM.

In one exemplary embodiment, the test signal and the acoustic signal emitted by the loudspeaker into the first volume is a single frequency sine wave signal for testing leakage from one volume to another.

The degree of sealing between the first and second acoustic volumes is determined in a step 310 and the process ends at step 312. The cross-correlation between the emitted test signal and detected ECM signal is taken. In at least one exemplary embodiment, the test signal and the measured acoustic signal emitted by the loudspeaker are conditioned using a time delay and frequency dependent filter. The ear-seal is determined to be low (or "leaky") if the cross-correlated signals are below a predetermined value. In at least one exemplary embodiment, automatic adjustments to the sealing section are made (such as deflating and re-inflating the sealing balloon to reseal the sealing section including retesting). Alternately, an audible sound, vocal response, or visual response can be provided to let the user know that the earpiece is sealed correctly or incorrectly.

Referring to FIG. 1, the earpiece is used as an example to illustrate a test sequence as disclosed in FIG. 3. Sealing unit 108 occludes an opening of ear canal 124 creating a first volume (ear canal 124) and a second volume (the ambient environment). Sealing unit 108 has a first side exposed to ear canal 124 and a second side is exposed to or corresponds to the ambient environment external to the ear.

In at least one exemplary embodiment, processor 116 is configured to receive a test signal in memory 104. Processor 116 generates the test signal and provides the test signal to Ear Canal Receiver 114 (ECR 114). ECR 114 emits the test signal into Ear Canal Receiver Tube (ECR Tube 112). The test signal propagates through ECR tube 112 and into ear canal 124. Ear Canal Microphone tube 110 (ECM tube 110) is configured to receive an acoustic signal incident on the first side of sealing unit 108. The test signal in ear canal 124 propagates through ECM tube 110 and is received by Ear Canal Microphone 106 (ECM 106). ECM 106 is configured to measure the test signal in ear canal 124 and provide the measured test signal to processor 116.

As shown, electronic housing unit 100 of the earpiece is adjacent to the second side of sealing unit 108. Electronic housing unit 100 is exposed to the ambient environment and for purposes of acoustic sealing analysis is considered the second side of sealing unit 108. Electronic housing unit 100 includes Ambient Sound Microphone 120 (ASM 120), which is configured to measure sounds in the ambient environment. Thus, ASM 120 receives and measures an ambient signal corresponding to a signal incident on the second side of sealing unit 108. ASM 120 provides the measured ambient signal to processor 116.

Ideally, sealing unit 108 is an acoustic barrier preventing the test signal or very little of the test signal from getting past sealing unit 108 and into the ambient environment. Conversely, sealing unit 108 if improperly sealed will pass some of the test signal. Processor 116 compares the test signal to the signal provided by ECM 106 corresponding to the acoustic signal in ear canal 124. In particular, processor 116 undertakes the cross-correlation between emitted test signal and the ECM signal.

Figure 4:
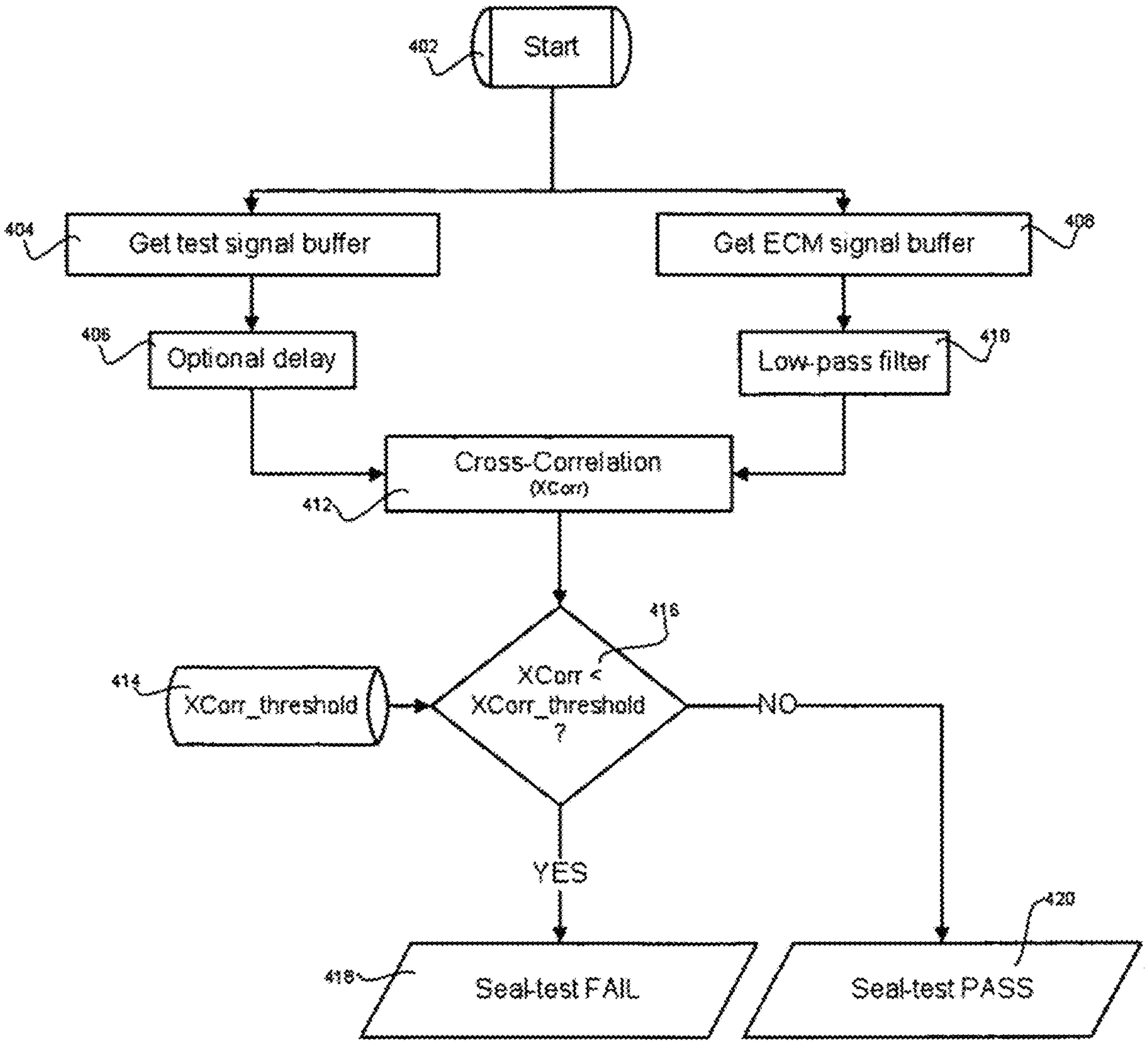
FIG. 4 is a flowchart to determine acoustic seal integrity of an earpiece in accordance with the exemplary embodiment.

Referring to FIG. 4, a flowchart of an exemplary method to determine the acoustic seal integrity of an earpiece in accordance with an exemplary embodiment is illustrated. In at least one embodiment of an acoustic sealing analysis system, the test signal is masked or used in a manner undetectable by the user. This allows unobtrusive (periodic or non-periodic) testing to determine if a device is sealed correctly ensuring optimum system performance and more importantly user safety.

In at least one exemplary embodiment, an audio content is provided in a step 402. A step 404 stores the test signal in a test signal data buffer. For example, a single frequency sine wave is stored in the test signal data buffer. The output (or alternatively—input) of the test signal data buffer is optionally delayed by digital delay unit 406. The function of delay unit 406 is to time-align the emitted test signal with the ECM signal so the cross-correlation is sensitive to changes in ear seal.

A step 408 stores the test ECM signal in a test signal data buffer. The output (or alternatively—input) of the ECM signal buffer can be filtered with a low-pass filter 410. The low pass filter can be configured so that the pass-band covers the frequency of the test signal. In one exemplary configuration, the low-pass filter can be a cascaded bi-quad IIR type filter with the cut-off frequency equal to 10 Hz greater than the test signal frequency.

A step 412 cross-correlates the optionally delayed test signal buffer with the low-pass filtered ECM signal buffer. An exemplary method for the cross-correlation algorithm is described in FIG. 5. The instantaneous cross-correlation (i.e. the cross-correlation at zero-lag) value from step 412 is compared with the cross-correlation threshold value 414 using comparator unit 416. If the instantaneous cross-correlation of the two signal buffers is less than the threshold value 414, then the seal test status is set to FAIL 418 (i.e. an ear-seal leak is detected); otherwise, if the cross-correlation is suitably high, the seal test status is set to PASS 420.

Figure 5:
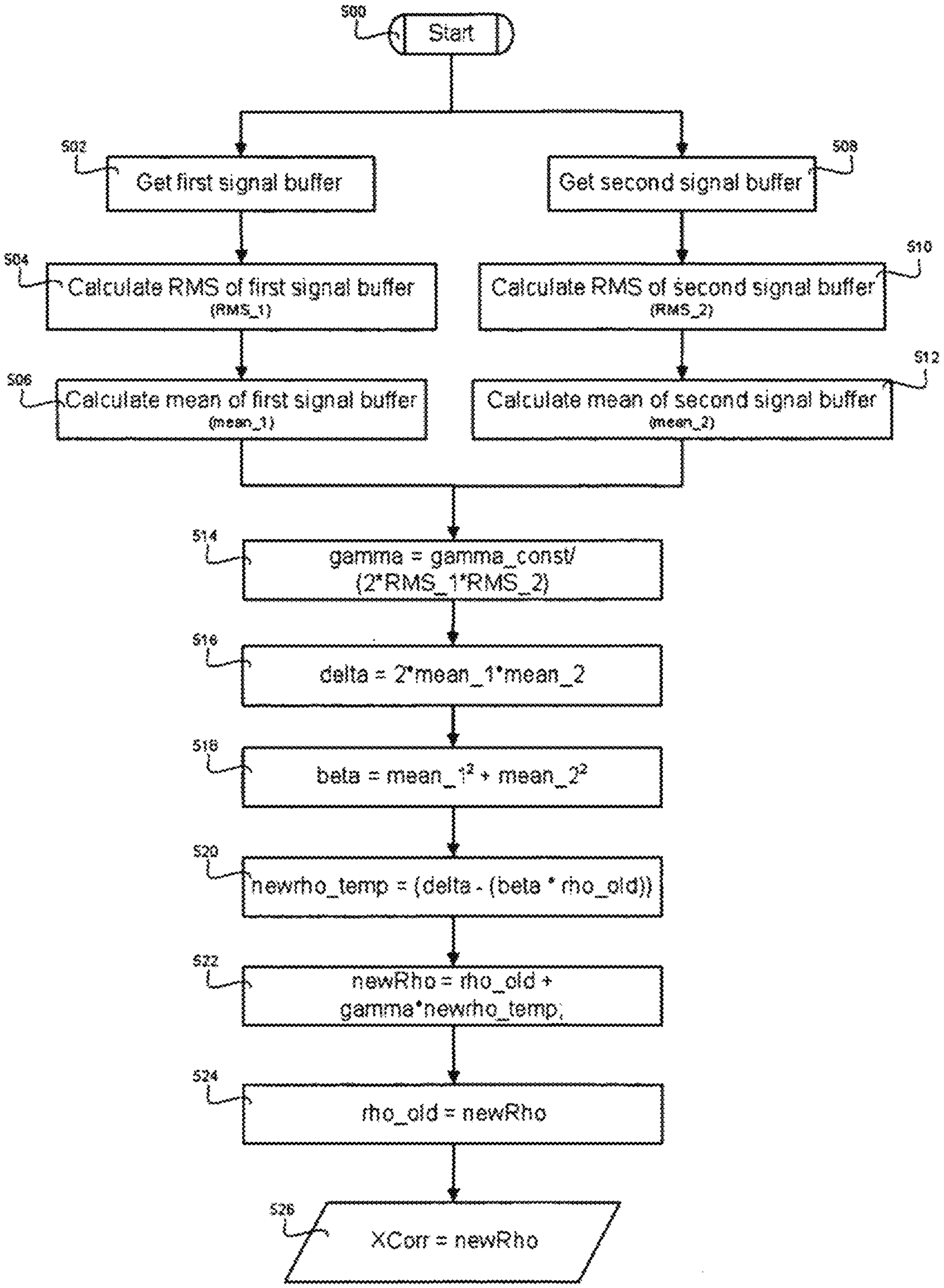
FIG. 5 is a flowchart of a method to estimate the instantaneous cross-correlation between a first and second audio signal.

Referring to FIG. 5, a flowchart of an exemplary embodiment to determine the instantaneous cross-correlation between a first audio signal and a second audio signal is illustrated. The process begins at step 500. In at least one exemplary embodiment, the first audio signal is the test signal (i.e. a sine wave) and the second signal is the low-pass-filtered ECM signal.

The correlation between two signals x and y at time k using an exponential window is defined as:

$$p(k) = \frac{S_{xy}(k)}{\sqrt{S_{xx}(k)_{yy}(k)}} \tag{1}$$

Where $$S_{xy}(k)=\Sigma_{l=0}^{\infty} c e^{-\eta l} x_{k-l} y_{k-l} \tag{2}$$

$$c=1-e^{-\eta}$$

And $S_{xx}$ and $S_{yy}$ are defined similarly as in (2) (replacing y with x for $S_{xx}$ etc.).

It can be shown (see Aarts et al, 2001) that (1) can be approximated with the recursion:

$$\hat{\rho}(k)=\hat{\rho}(k-1)+\gamma[\partial_k-\beta_k\hat{\rho}(k-1)] \tag{3}$$

$$\partial_k=2x_k y_k$$

$$\beta_k=\alpha x_k^2 \alpha^{-1} y_k^2$$

Where $$\alpha = \frac{y_{RMS}}{x_{RMS}} \tag{4}$$

$$\gamma = \frac{ce^{\eta}}{2x_{RMS}y_{RMS}}$$

The cross-correlation estimate using the above recursion is modified for block-wise processing rather than the sample-by-sample basis. This modification replaces the sample values (i.e. x(k) and y(k)) with values for the N-length block mean, i.e.

$$x(k) = \frac{1}{N}\sum_{l=0}^{N-1} x(k-l)$$

Furthermore, the numerator for y is replaced with a small constant and so is a (replacing a with a constant effectively un-normalizes the correlation estimate). It is found that the modified un-normalized block-wise cross-correlation accurately estimates the cross-correlation compared with using the standard cross-correlation for two signals.

The modified block-wise fast cross-correlation algorithm, as summarized in FIG. 5, comprises the following steps:

1. A first signal buffer 502 is accumulated. This signal buffer corresponds to the emitted test signal (i.e. the sine wave).
2. The RMS level of the first buffer is calculated 504 ($x_{RMS}$)
3. The mean level of the first buffer is calculated 506.
4. A second signal buffer 508 is accumulated. This signal buffer corresponds to the filtered ECM signal.
5. The RMS level of the second buffer is calculated 510 ($y_{RMS}$).
6. The mean level of the second buffer is calculated 512.
7. In step 514, γ (gamma) is approximated as:

$$\gamma = \frac{\Gamma}{2x_{RMS}y_{RMS}}$$

Where Γ is a small constant, e.g. 10E-3.

8. In step 516, $\partial_k$ (delta) calculated as twice the product of the first signal buffer mean and the second signal buffer mean.
9. In step 518, beta is calculated as the sum of the square of the mean value of the first buffer with the sum of the square of the mean value of the second buffer.
10. In step 520, the new temporary estimate of the correlation newRho_temp is calculated as: newRho_temp=(delta−beta*rho_old))
11. In step 522, the new estimate of the correlation newRho is updated by summing the previous estimate of the correlation with the product of gamma and the temporary estimate of the correlation newRho_temp.

12. In step 524, the "old" value of the correlation is set to the newest correlation estimate, ready for the next iteration of the update algorithm.
13. In step 526, the current correlation estimate between the emitted test signal and the received and filtered ECM signal is set as equal to the value of newRho.

Figure 6:
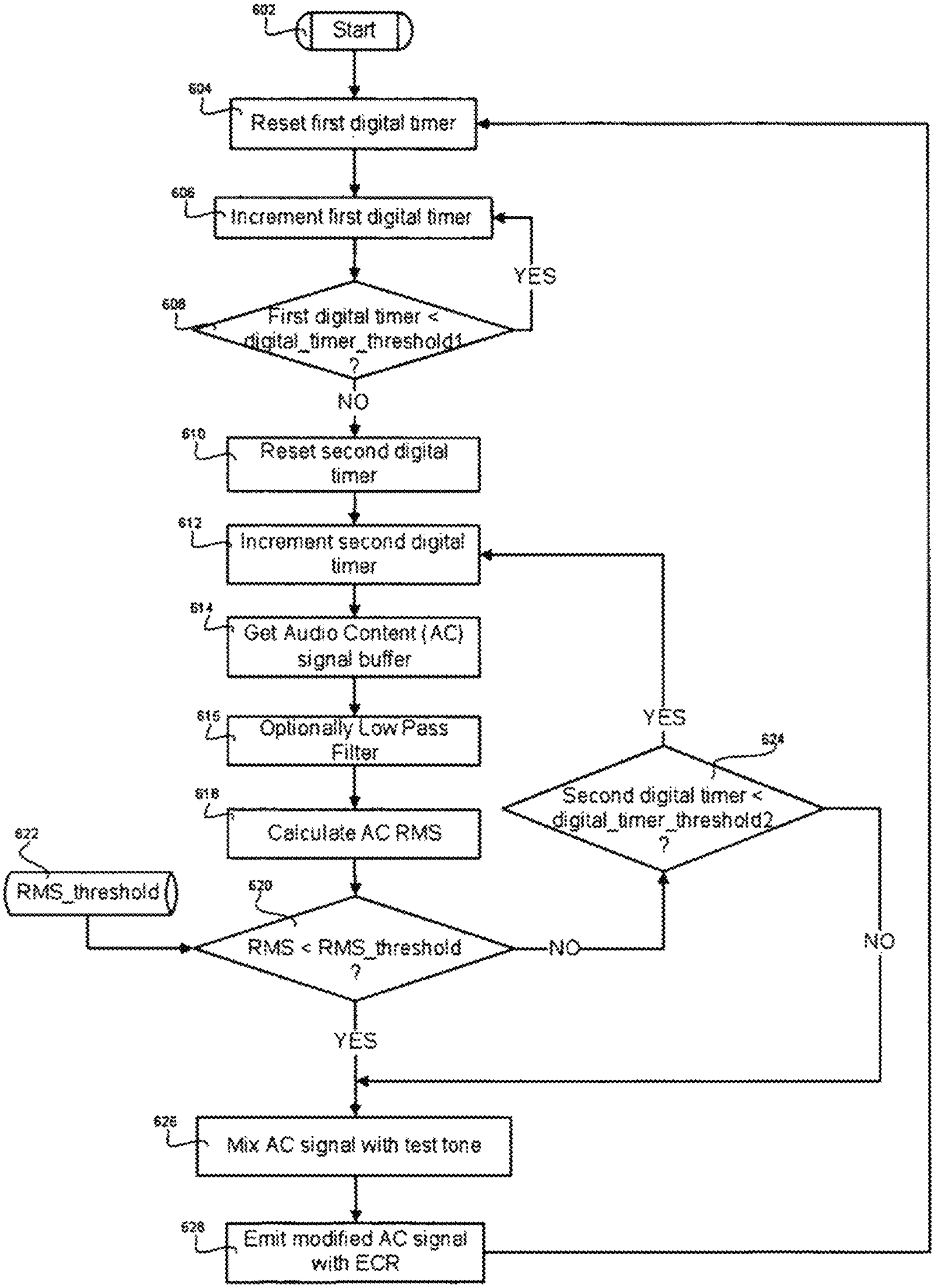
FIG. 6 is a flowchart to determine when to emit a test signal in accordance with an exemplary embodiment.

Referring to FIG. 6, a flowchart of a method to determine when to emit the test signal is shown. The test signal is emitted when the test can be performed unobtrusively to the user and also provides an accurate test. In at least one exemplary embodiment, a test event to determine if an earpiece is sealed correctly is initiated via a timing methodology. In a first timing scenario, the test event occurs after a delay of a first predetermined time period when the RMS of the Audio Content (AC) is less than a RMS threshold. In a second timing scenario, the delay of the first predetermined time period is allowed to lapse without the test event occurring when the RMS of the audio content is greater than the RMS threshold. A second predetermined time period is started where the test event occurs when the RMS of the audio content is less than the RMS threshold. The test event is then initiated when the second predetermined time period is exceeded independent of the RMS of the audio content.

A test sequence is initiated in a step 602. The previous seal test event resets the first digital timer in a step 604. A time delay is generated by the loop comprising steps 606 and 608. The first digital timer is time incremented in the step 606. After each added time increment, the first digital timer is compared against a digital_timer_threshold1. The first digital timer is time incremented (after the time has advanced another increment) after the comparison in the step 608 if the first digital timer is less than the digital_timer_threshold1.

A second digital timer is reset in a step 610 when the first digital timer is greater than the digital_timer_threshold1. The second digital timer is time incremented in a step 612. Audio content (AC) from a signal buffer is retrieved in a step 614. The audio content can be filtered through a low pass filter in an optional step 616. The RMS of the audio content is calculated in a step 618. The calculated RMS of the audio content is compared against an RMS_threshold 622 in a step 620. The second digital timer is compared against a digital_timer_threshold2 in a step 624 if the RMS of the audio content is greater than the RMS_threshold. The second digital timer is time incremented (after the time has advanced another increment) when the second digital timer is less than digital_timer_threshold2 in the step of 624.

The audio content signal is mixed with the test signal when the RMS of the audio content is less than the RMS_threshold in a step 626. Also, the audio content signal is mixed with the test signal when the second digital timer is greater than digital_timer_threshold2 in the step 624. The modified audio signal (having the test signal mixed in) is emitted by the ECR in a step 628 for testing the sealing section of the earpiece. The first digital timer is then reset in the step 604 to begin a timing sequence for another sealing section test.

Figure 7:
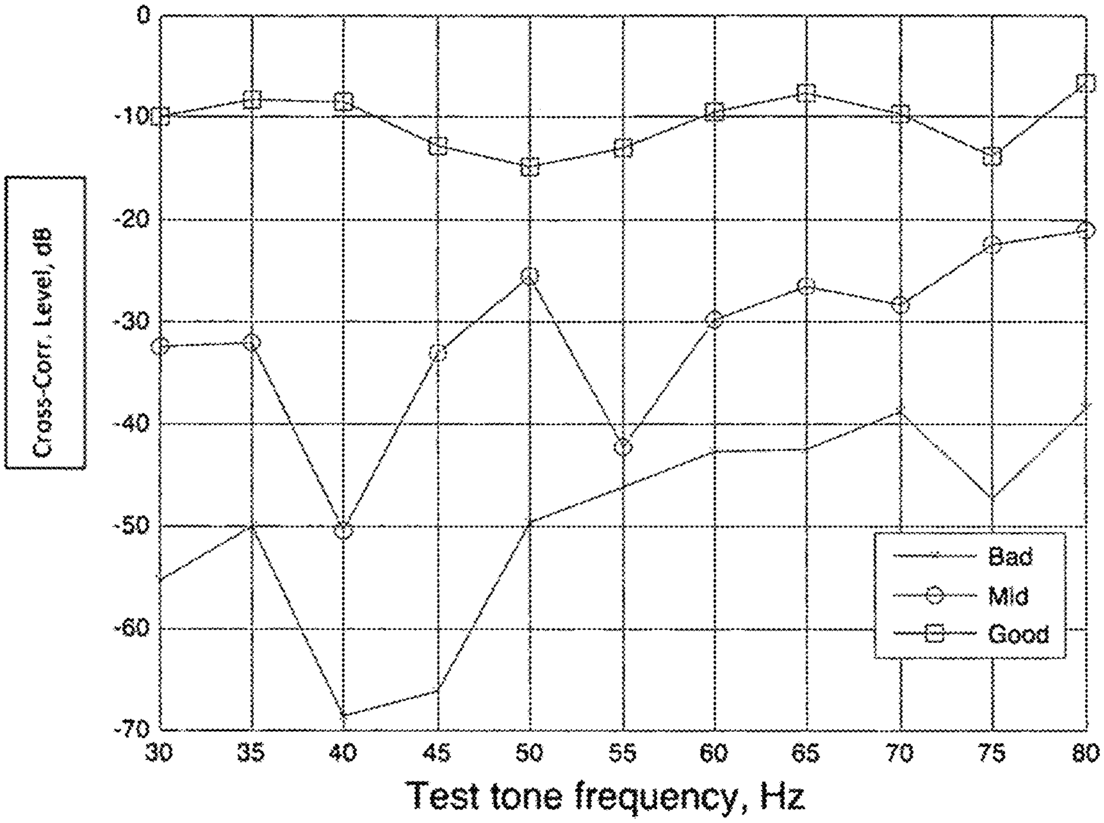
FIG. 7 is a graph illustrating different seal measurements in accordance with the present invention.
Figure 10:
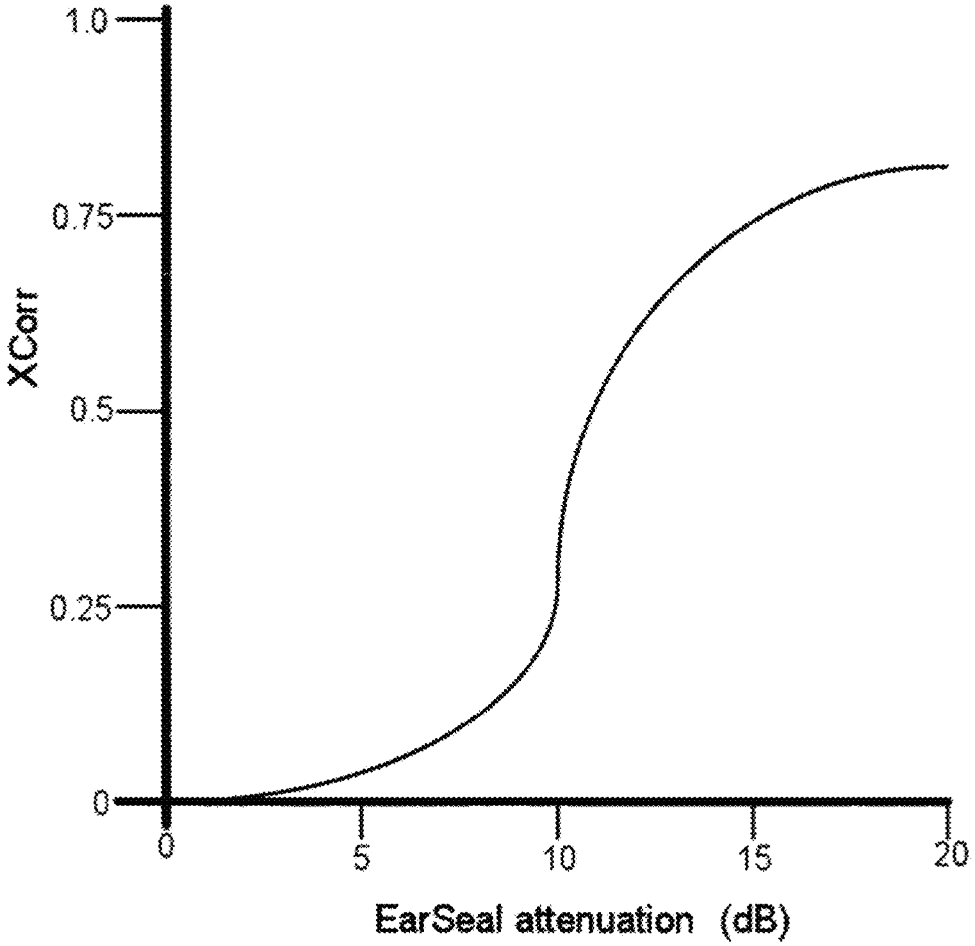
FIG. 10 illustrates a sample relationship between EarSeal attenuation and XCorr in accordance with at least one exemplary embodiment.

FIG. 7 is a graph illustrating different seal measurements in accordance with the present invention. The estimated un-normalized cross-correlation between the ECM signal and the test signal (i.e. sine wave) is shown for different sine wave frequencies from 30-80 Hz. Three different curves are provided corresponding to a good fit (i.e. a tight optimal seal providing approximately 20-30 dB of acoustic attenuation), mid or partial seal (i.e. an ear-seal that could be characterized as "half in" providing approximately 10-15 dB of acoustic attenuation), and a poor seal (i.e. an ear-seal providing less than 10 dB of acoustic attenuation). At lower test frequencies, the change in correlation is more pronounced as the degree of ear seal fitting is changed from "good" to "mid" and "poor". From the data, the threshold used to determine whether the ear seal can be characterized as "good" is approximately −20 dB, (i.e. 0.85 of FIG. 10 which corresponds to the value for XCorr threshold 414 in FIG. 4).

In at least one exemplary embodiment, the test signal for testing a seal of a sealing section is less than 200 hertz. The frequency of the emitted test signal is chosen to satisfy the requirements of being able to reveal small degradations in ear seal quality. It is also beneficial if the selected test signal frequency can be acoustically masked by reproduced audio to minimize detection of the test by an earpiece user. Both of these criteria are met using a test signal frequency below 200 Hz. The sensitivity is highest from the measured data at frequencies below 50 Hz. Conversely, as the test signal frequency increases the cross-correlation difference between a "good" and "bad" acoustic seal decreases. For example, with a 40 Hz test tone, the cross-correlation for a "good" ear seal is −8 dB, and for a bad ear seal it is −68 dB (i.e. a 60 dB difference). At a test signal frequency of 80 Hz, the cross-correlation for a "good" ear seal is −8 dB and for a bad ear seal it is −38 dB (i.e. a 30 dB difference). Thus, above 200 Hz the cross-correlation difference between a "good" and "bad" acoustic seal is further reduced thereby reducing the sensitivity of the test.

Using the cross-correlation rather than a level differencing approach improves the accuracy and minimizes errors which occur due to user non-speech body noise, such as teeth chatter; sneezes, coughs, etc. Furthermore, such non-speech user generated noise would generate a larger sound level in the ear canal than on the outside of the same ear canal producing inaccurate results.

Figure 8:
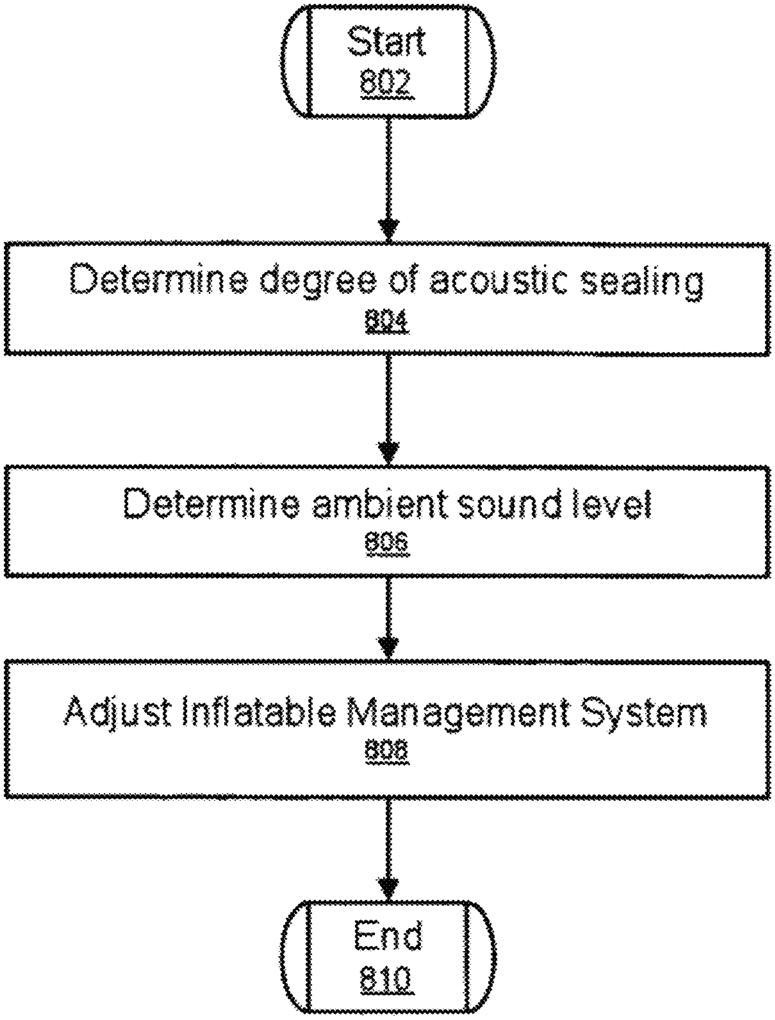
FIG. 8 is a block diagram for a method of adjusting the IMS system in accordance with at least one exemplary embodiment.

FIG. 8 is a flowchart to adjust the degree of acoustic sealing of an Inflation Management System (IMS) in accordance with an exemplary embodiment. The IMS is adjusted depending on the degree of acoustic sealing provided by an earpiece. The method begins at step 802. The acoustic sealing is measured as disclosed in FIG. 7 and the result provided in a step 804 to determine the cross-correlation (XCorr) between a test signal and corresponding ECM signal. In general, the higher the cross-correlation, the higher the degree of acoustic sealing. An exemplary graph showing the relationship between XCorr and acoustic sealing is given in FIG. 10. The degree of acoustic sealing is determined from known XCorr using a look-up (or "hash") table or using a formula (e.g. of a polynomial form) that maps the acoustic sealing to the known XCorr value. The ambient sound level is measured in a step 806. The ambient sound level corresponds to the noise level in proximity to the user. In general, a higher degree of attenuation is desired when the ambient sound levels are high. Conversely, at low ambient sound levels the attenuation level of the IMS may be less of an issue and comfort more of a factor. The IMS is adjusted in a step 808 to meet the attenuation needs. In general, inflating the IMS increases attenuation while deflating the IMS decreases attenuation. The method terminates at step 810.

Figure 9:
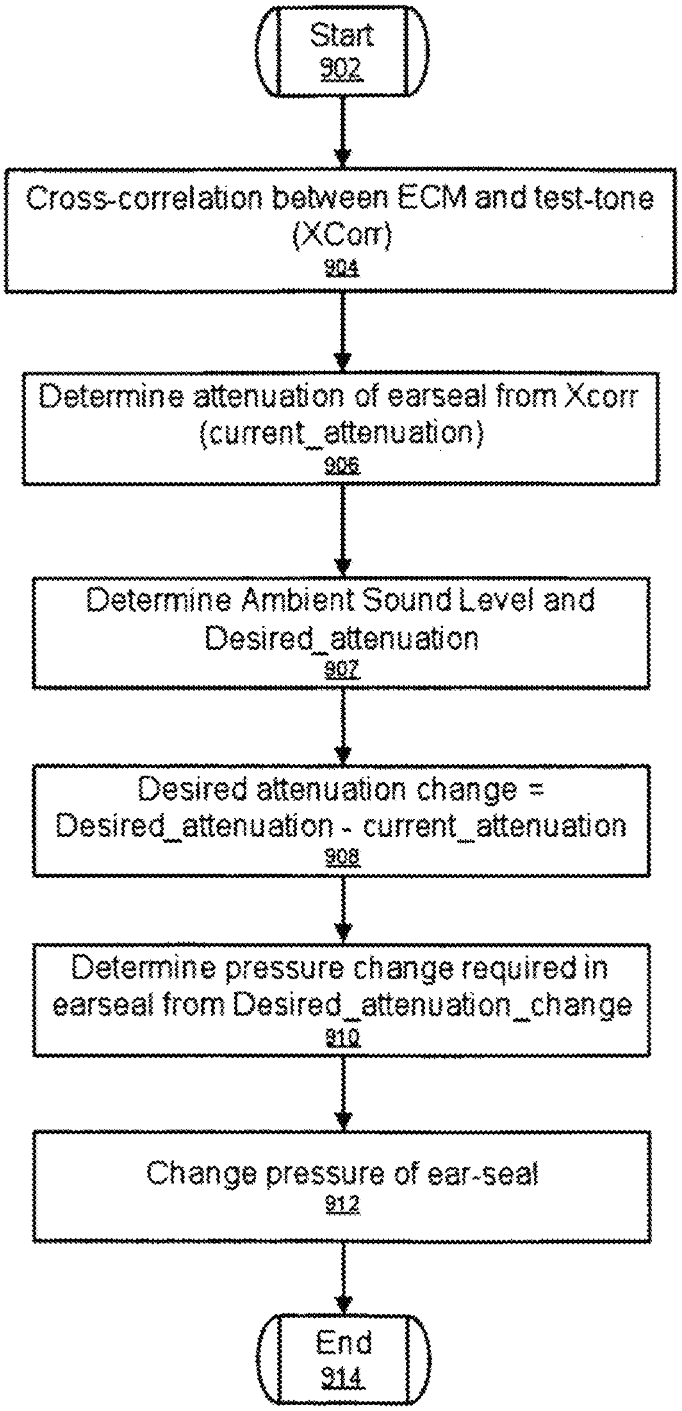
FIG. 9 is a block diagram for a method of adjusting IMS pressure in accordance with at least one exemplary embodiment.

Referring to FIG. 9, a more detailed flowchart to adjust the degree of acoustic sealing of an Inflation Management System (IMS) is shown. In general, the attenuation increases when the pressure in the IMS is raised thereby allowing a degree of control to make adjustments. For example, an adjustment is made to increase attenuation when the background noise level rises or a seal check produces a failed result. Adjustments are made until the seal check passes. The pressure level adjustments of the IMS will fall within a comfort range of a user (e.g., between 0.1 bar and 0.3 bar gauge pressure). Typically, the pressure level is set at a minimum level to achieve a predetermined attenuation level.

The method begins at step 902. The degree of acoustic sealing is determined from cross-correlation between the ECM signal and the generated test signal. The XCorr value is provided in a step 904. In step 906, the attenuation provided by the IMS is calculated (equation) or looked up (table) from data such as that shown in FIG. 10. In one exemplary embodiment, the desired attenuation value is dependent on the ambient sound level of the user. In another exemplary embodiment, the desired attenuation value is dependent on the ear-canal sound level of the user. In yet another exemplary embodiment, the desired attenuation value is dependent on the level of audio content (e.g. speech or music audio) reproduced with the earphone device. In all of the above examples, the desired attenuation value is determined by one or more of the embodiments in a step 907.

The difference between the degree of acoustic sealing determined in step 906 and the desired attenuation value determined in step 907 is calculated in step 908. The difference value in step 908 is used to determine the change in pressure of the IMS necessary to minimize the difference value in a step 910. In at least one exemplary embodiment, the difference value of the attenuation is converted into a corresponding pressure value change (e.g. in milli-Bars) using a similar look-up table or equation method as described previously. The pressure change in the IMS is then affected with step 912 to meet the desired attenuation level. For example if the desired attenuation is a decrease of 10 dB in sound across the earpiece in the ear canal, then a pressure of a variable volume inflatable system can have a gauge pressure of about 0.15 bar. If the desired attenuation is a decrease of 20 dB across the earpiece in the ear canal then the gauge pressure can be increased to about 0.25 bar, where an increased pressure is associated with an increase in attenuation. An experimental table for each earpiece can be generated in a standard devised experimental setup (e.g. impedance tunnel) and referred to when changes are needed. The method ends at step 914.

Figure 11:
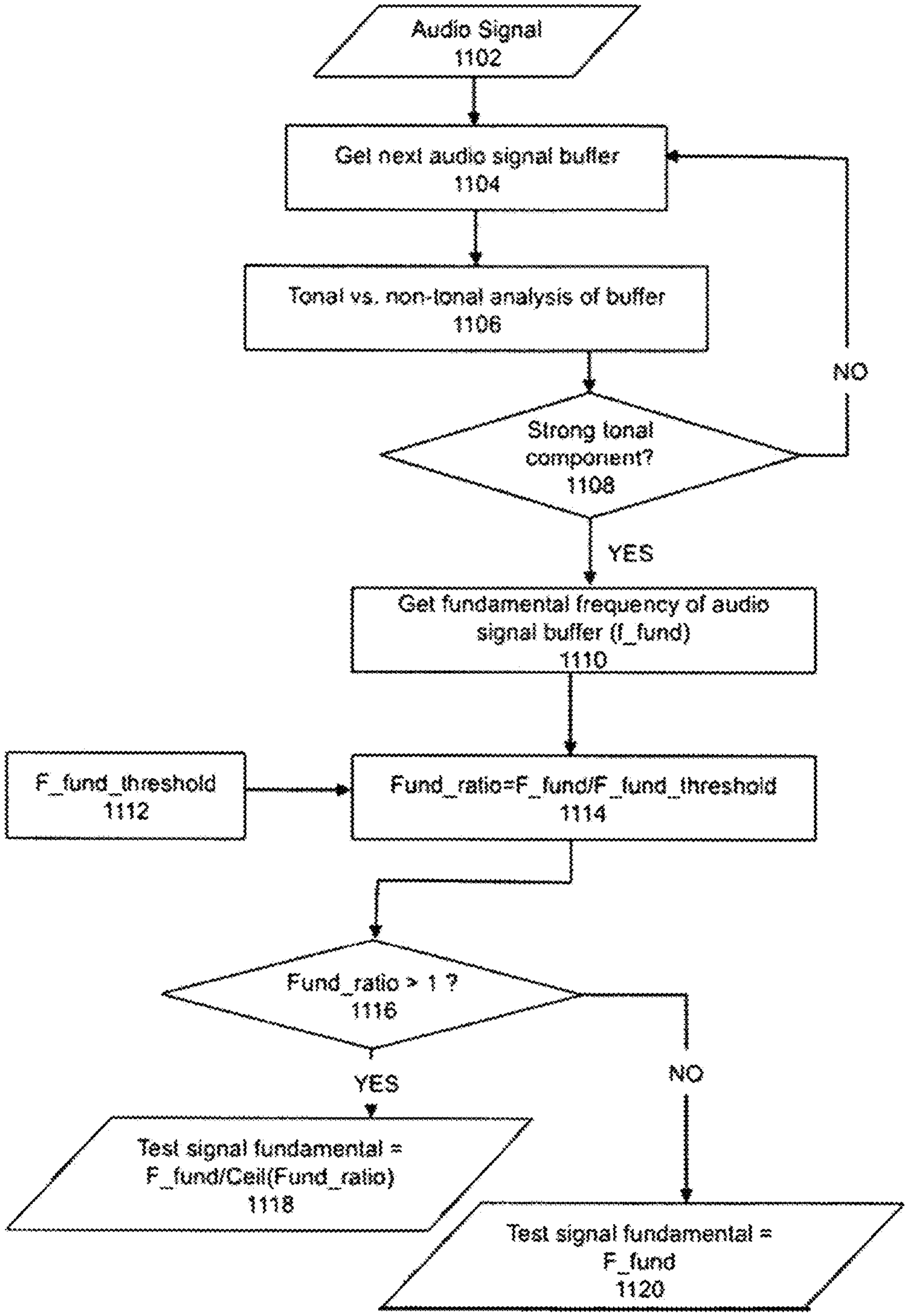
FIG. 11 illustrates a flowchart of an exemplary method to determine a test signal fundamental.

Referring to FIG. 11, a flowchart of an exemplary method to determine a test signal fundamental is illustrated. In at least one embodiment of an acoustic sealing analysis system, the test signal is masked or used in a manner undetectable by the user or made pleasant such that the user is unaware that the test signal is being played. This allows unobtrusive (periodic or non-periodic) testing to determine if a device is sealed correctly ensuring optimum system performance and more importantly user safety.

In at least one exemplary embodiment, an audio content 1102 is provided. A step 1104 stores audio content 1102 in a data buffer. In this example, audio content 1102 is music played from a media player and received via a wired or wireless connection to at least one earpiece in the user's ear. An alternate example would be that audio content 1102 is a speech audio signal from a portable telephone device or the like.

A step 1106 determines if the buffer of audio content 1102 comprises a strong tonal signal component. Mixing the test signal having a similar fundamental frequency as audio content 1102 will mask the test signal when played to the user. Thus, the test signal is musically in harmony with the reproduced music and results in very little perceptual degradation in sound quality.

A step 1108 determines whether to update or generate the first fundamental tone for the test signal. The test signal is not updated or generated if buffered audio content 402 does not contain a strong tonal signal component. A return to step 1104 fills the buffer with the next audio content 402 for analysis.

A step 1110 analyzes the buffer of data of audio content 1102 when it has been determined that it contains a strong tonal signal component. Step 1110 determines the fundamental frequency of the tonal signal. The fundamental tone, often referred to as the fundamental and abbreviate $f_0$ is the lowest frequency in a harmonic series. The fundamental frequency (also called a natural frequency) of a periodic signal is the inverse of the pitch period length. The pitch period is the smallest repeating unit of a signal. The fundamental frequency of the tonal signal can be calculated using an autocorrelation analysis.

In one exemplary embodiment, a mathematical operation 1114 is performed where the frequency component of the test signal is limited to a frequency range below a lower minimum and upper maximum frequency range. Fund_ratio is calculated, which is defined as a ratio of the determined fundamental frequency (F_fund) of the tonal signal from step 1110 to an upper threshold value F_fund_threshold 1112, which in one exemplary embodiment, is a fixed constant equal to approximately 100 Hz. In general, F_fund_threshold 1112 is chosen to be a low frequency value which is above the lowest (or −3 dB) frequency that a transducer can reproduce, but below a predetermined frequency. In a comparison step 1116, if the estimated F-fund is higher than the F_fund_threshold 1112 (ratio>1), then F_fund is reduced by an integer multiple to be below F_fund_threshold 1112 corresponding to the mathematical operation of step 1118. Otherwise, the test signal fundamental is equal to F_fund as shown in step 1120. Although not shown, the calculated test signal fundamental is compared and determined to be greater than a predetermined threshold.

Referring to FIG. 1, in at least one exemplary embodiment, processor 116 is configured to receive or generate audio content. As mentioned previously, the audio content can from external devices such as a portable phone or a media player. Memory 104 can be used as a buffer for the audio content. Processor 116 is configured to receive the buffer of audio content from memory 104. The steps and calculations of the block diagram of FIG. 4 are then performed by processor 116. The result being one of the identification of a strong tonal signal component in the buffer of audio content and the test signal fundamental or loading the buffer with new audio content and starting the process again.

Figure 12:
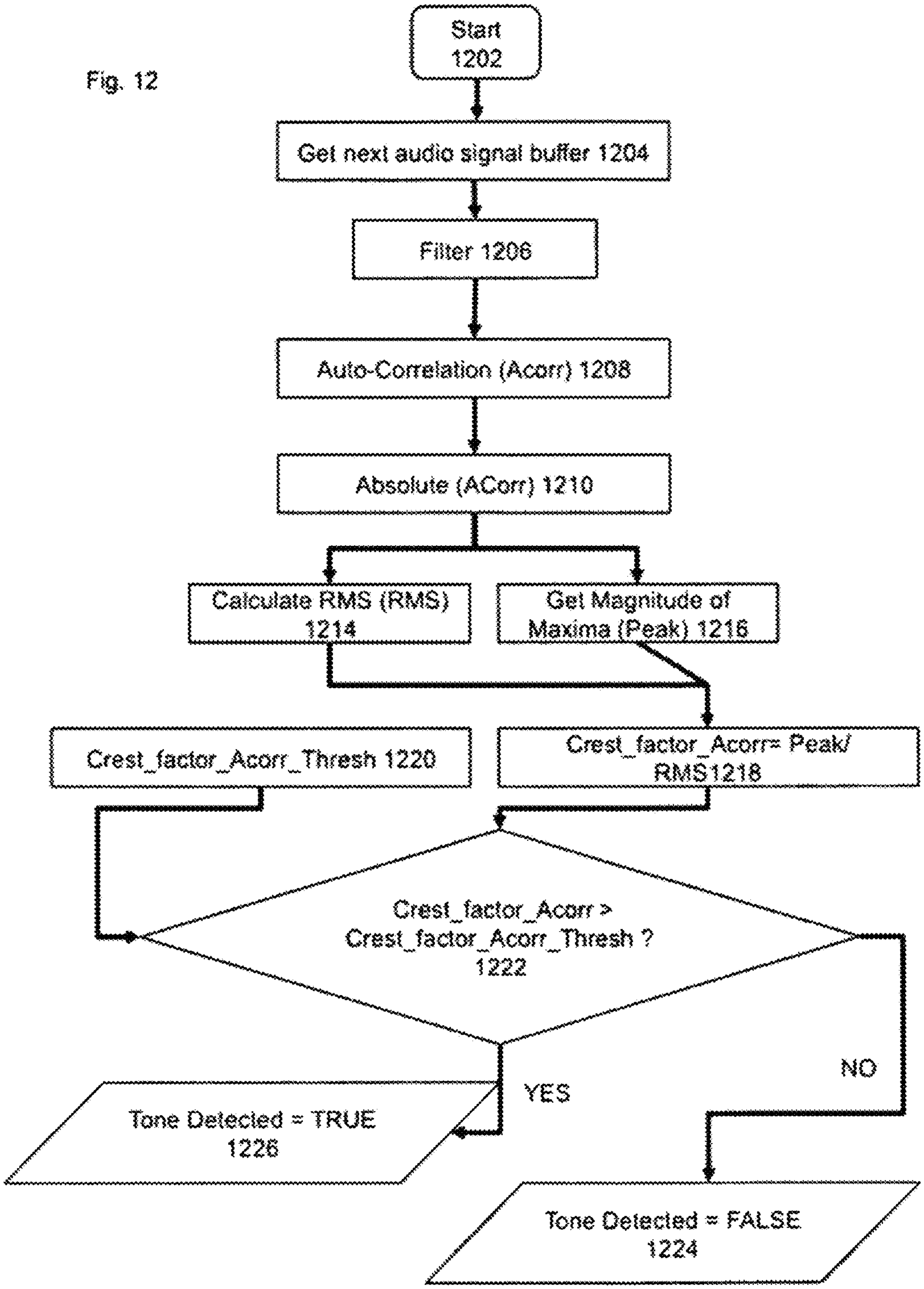
FIG. 12 illustrates a flowchart of an exemplary embodiment to determine tonal presence in audio content.

Referring to FIG. 12, a flowchart of an exemplary embodiment to determine tonal presence in audio content is shown. In particular, the exemplary embodiment relates to step 1106 of FIG. 11 that analyzes audio content stored in a buffer. The method begins at step 1202. A step 1204 gets the audio content stored in an audio signal buffer hereinafter called the audio signal. A filter step 1206 filters the audio signal to a frequency range of interest that relates to a sealing test frequency. For example, a band pass filter in the range of 20 Hz to 500 Hz could be used to filter the audio signal where the test signal is in the lower audio frequency range. An auto-correlation step 1208 analyzes the audio signal where a strong tonal signal component is represented by peaks in the analysis results. A step 1210 generates Absolute (Acorr) which is a number representing the absolute magnitude of the peaks from the analysis. For example, Absolute (Acorr) can be the square of the results from the autocorrelation.

A crest_factor_Acorr 1218 is generated from the results by calculating an RMS value 1214 (or time-averaged peak value) and peak value 1216 (or time averaged peak value). In at least one exemplary embodiment, the crest_factor_Acorr 1218 is the ratio of the peak value to the RMS value of an absolute auto-correlation sequence of the audio signal.

A comparison step 1222 is then performed. A strong tonal presence is identified when crest_factor_Acorr 1218 is greater than a threshold Crest_factor_Acorr_threshold 1220. Identification of the strong tonal presence indicates the audio signal would facilitate masking of the test signal to determine sealing of the device (step 1226). The audio signal is not used in conjunction with the test signal if crest_factor_Acorr 1218 is less than Crest_factor_Acorr_threshold 1220 (step 1224). The process would begin again loading a next sequence of the audio signal into the buffer for review.

Referring to FIG. 1, as mentioned previously, audio content is stored in a buffer, for example memory 104. The audio content in the buffer is provided to processor 116. In at least one exemplary embodiment, processor 116, runs the analysis as described in the block diagram of FIG. 12 thereby determining if a strong tonal presence is found in the audio content in the buffer. New audio content is loaded into the buffer (memory 104) if a strong tonal presence is not found beginning the procedure again.

Figure 13:
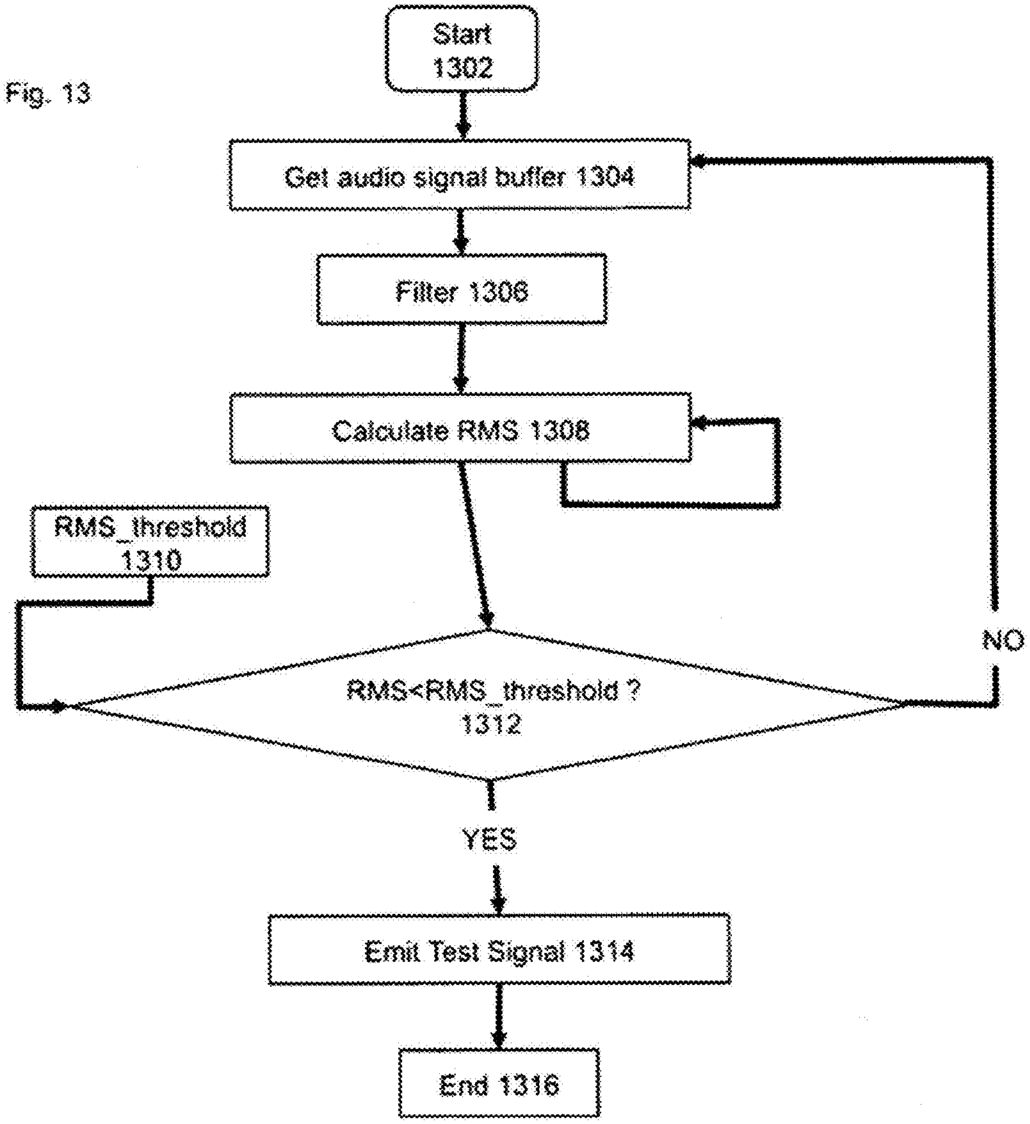
FIG. 13 illustrates a flowchart of a method to determine when to emit the test signal.

Referring to FIG. 13, a flowchart of a method to determine when to emit the test signal is shown. The method begins at step 1302. The test signal is emitted when the test can be performed unobtrusively to the user and also provide an accurate test. In a step 1304, an audio signal is retrieved from a buffer. In at least one exemplary embodiment, the audio signal is received from an ECM or an ASM. The audio signal is measured to determine when the sound level is low in the ear canal, the ambient environment, or both. In general, the test signal is emitted when the sound level is low.

A filter step 1306 band pass filters the audio signal. In one exemplary embodiment, filter step 1306 filters the audio signal from 50 Hz to 150 Hz which corresponds to a frequency range of the test signal. In a step 1308, the RMS of the audio signal is calculated. The audio signal is analyzed to detect when the energy within an audio frequency range is below a threshold RMS_threshold 1310. The RMS of the audio signal is the signal level in the volume being measured. A comparison step 1312 compares the measured RMS level of the filtered audio signal against RMS_threshold 1310. In a step 1314, a test signal is emitted when the measured RMS value is less than RMS_threshold 1310. No test signal is emitted when the RMS of the audio signal is greater than RMS_threshold 1310. The method ends at step 1316.

Figure 14:
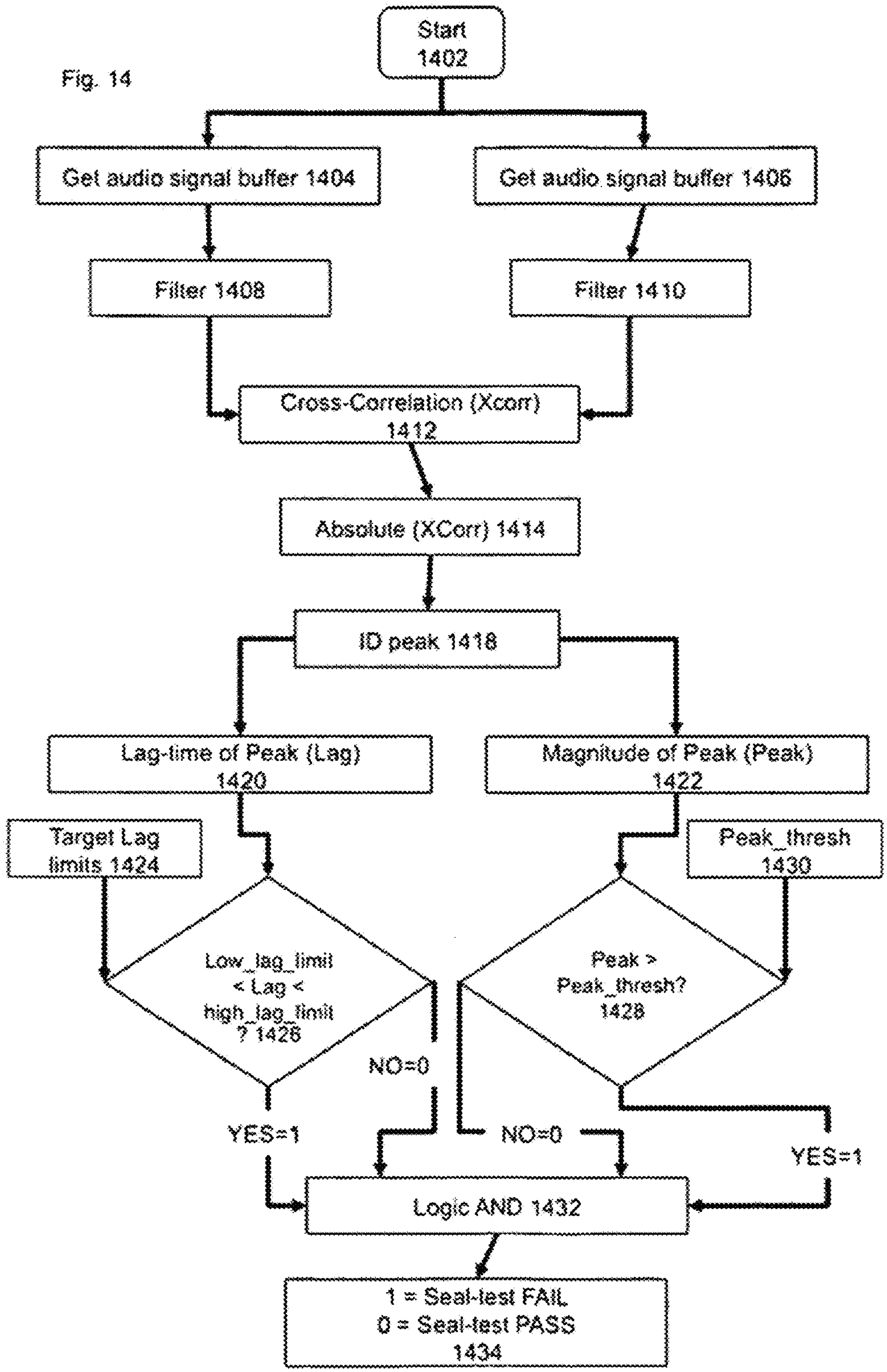
FIG. 14 illustrates a flowchart of an exemplary method to determine acoustic seal integrity.

Referring to FIG. 14, a flowchart of an exemplary method to determine acoustic seal integrity is illustrated. For example, an earpiece seal integrity corresponds to a full or partial acoustic barrier between a first volume (ear canal) and a second volume (ambient environment). In one exemplary embodiment, the degree of acoustic seal integrity is expressed as either a PASS or FAIL status, where FAIL indicates that the acoustic seal is compromised relative to a normal operating acoustic seal. For example, an earpiece that has performed the seal test and determined that the sealing unit is not sealed correctly in the ear canal of the user can provide a signal or message indicating the problem. The user can then remove, reinsert, and retest the earpiece to ensure that the seal is within normal operating specifications.

The method begins at step 1402. An acoustic test signal is provided in a first volume. In a step 1404 a transducer measures the acoustic test signal and stores it in a signal buffer. In a step 1406, a second transducer in a second volume isolated from the first volume by an acoustic barrier measures a second acoustic signal in the second volume. A portion of the acoustic test signal passes the acoustic barrier into the second volume. The amount of the acoustic test signal passing the acoustic barrier is a measure of the seal provided by the acoustic barrier.

In a filter step 1408, the measured acoustic test signal in the first volume is filtered in a frequency range corresponding to the acoustic test signal to remove signals that are not part of the test. The measured signal from the first volume is heretofore called the first volume signal. Similarly, in a step 1410, the measured signal in the second volume is filtered in a frequency range corresponding to the acoustic test signal to remove signals not related to the test (outside the frequency range) in the second volume. The measured signal from the second volume is heretofore called the second volume signal.

A correlation, cross-correlation, or coherence analysis is performed on the first volume signal and the second volume signal. The correlation, cross-correlation, or coherence analysis is a measure of the similarity of the signals in the first and second volumes. In particular, the non-difference analysis measures the acoustic test signal leaking past the acoustic barrier by identifying the portion of the second volume signal that is similar to the acoustic test signal in the first volume.

In at least one exemplary embodiment, a correlation step 1412 is performed comprising a cross-correlation of the first volume signal and the second volume signal. In a step 1414, the peak of the cross-correlation is identified. The peak of the cross-correlation is Absolute(XCorr). In a mathematical step 1418, the Lag-time of Peak 1420 and the Magnitude of Peak 1422 is calculated. The Lag-time of Peak 1420 is a measure of the time delay between receiving the signals in the first and second volumes. In particular, the first volume signal should be received before the second volume signal. The Magnitude of Peak 1422 corresponds to the similarity between the signals in the first and second volumes. Thus, a larger number for Magnitude of Peak relates to more leakage of the acoustic test signal getting past the acoustic barrier.

Two comparisons are performed that determine if the acoustic barrier is sealed correctly based on the measured and calculated data from the first and second volumes. In a comparison step 1426, the measured Lag-time of Peak is compared against Target Lag Limits 1424. The measured lag-time should fall within the predetermined range (Target Lag Limits 1424) for the seal test to be valid. If the Lag-time of Peak is within the appropriate range then a logic 1 is provided to AND function 1432, otherwise a logic 0 is provided. In a second comparison step 1428, the Magnitude of Peak is compared against a Peak_threshold 1430. If the Magnitude of Peak is greater than the Peak_threshold 1430 a logic 1 is provided to AND function 1432. This indicates that a significant portion of the acoustic test signal is present in the second volume measurement, otherwise a logic 0 is provided. A FAIL output 1434 corresponds to a logic 1 at the output of AND function 1432. The FAIL occurs when the Lag-time of Peak is within the predetermined range and the Magnitude of Peak is greater than the Peak_threshold indicating that the acoustic barrier is sealed improperly. All other conditions indicate a PASS output 1434 and the acoustic barrier is sealed correctly.

In at least one exemplary embodiment and referring briefly to FIG. 1, an earpiece is tested to determine if sealing unit 108 is sealed correctly to the ear canal of the user. Sealing unit 108 creates a first volume in ear canal 124 and a second volume outside the ear canal 124 in the ambient environment. A masking approach is used to perform seal testing unobtrusively to the user. The user is listening to music or speech (audio content) provided to ear canal 124 from ECR 114.

The music or speech is buffered in memory 104 or memory in processor 116. Processor 116 analyzes the audio content in the buffer to identify a strong tonal content. A test signal can be created once audio content with strong tonal content is found. The test signal will have at least one fundamental pitch corresponding to the strong tonal content and optionally further harmonics. Processor 116 also analyzes the measured signals from ECM 106 and ASM 120 to determine when to emit the test signal. Processor 116 monitors and compares the sound level in the ambient environment and ear canal 124. Processor 116 will provide the generated test signal to ECR 114 during an optimum time for test accuracy such as when the ambient sound level is low, the ear canal sound level is low, or both. Also, processor 116 will not output the test signal if there is audio content similar to the test signal in the ear canal or ambient environment.

Processor 116 monitors the test conditions and then provides the test signal to ECR 114 when an accurate sealing test can be performed. ECR 114 outputs an acoustic test signal which may or may not have other audio content. ECM 106 and ASM 120 respectively measure acoustic signals in ear canal 124 and the ambient environment. Processor 116 is operatively coupled to ECM 106 and ASM 120. The measured signals are buffered in memory 104.

In an exemplary embodiment, a cross-correlation is used to measure the similarity between the signals in ear canal 124 and the ambient environment. Processor 116 performs the cross-correlation calculations using the measured acoustic signals from ECM 106 and ASM 120. In particular, the cross-correlation is used to identify and compare the acoustic test signal present in the two volumes separated by the acoustic barrier. A cross-correlation between ASM and ECM signals is defined according to the following equation (5):

$$XCorr(n,l)=E_{n=0}{}^{N}ASM(n)ECM(n-1), \tag{5}$$

Where: l=0, 1, 2, . . . N

Where ASM(n) is the $n^{th}$ sample of the ASM signal, and ECM(n−l) is the $(n-l)^{th}$ sample of the ECM signal. A peak of the absolute cross-correlation is estimated using a peak-picking function and also the lag time at which this peak occurs (i.e. the index I at which this occurs). Thus, the Lag-time of Peak and the Magnitude of Peak are known and respectively compared against a Target Lag Limit range and a Peak Threshold. The user of the earpiece is notified or warned that sealing unit 108 is improperly sealed by processor 116 if the measured Lag-time of Peak is within the Target Lag Limit range and the Magnitude of Peak is greater than the Peak Threshold.

Like Correlation and Cross-Correlation, a coherence function is also a measure of similarity between two signals. Coherence is another non-difference comparison approach that can be used for detecting acoustic seal integrity. Coherence is defined as:

$$\gamma_{xy}^2=\frac{|G_{xy}(f)|^2}{G_{xx}(f)G_{yy}(f)}$$

Where Gxy is the cross-spectrum of two signals (e.g. the ASM and ECM signals), and can be calculated by first computing the cross-correlation in equation (5), applying a window function, for example a Hanning window, and transforming to the frequency domain, for example via an FFT. Gxx or Gyy is the auto-power spectrum of either the ASM or ECM signals, and can be calculated by first computing the auto-correlation (using equation 5, but where the two input signals are both from either the ASM or ECM and transforming to the frequency domain. The coherence function gives a frequency-dependent vector between 0 and 1, where a high coherence at a particular frequency indicates a high degree of coherence at this frequency, and can therefore be used to analyze test signal frequencies in the ASM and ECM signals whereby a high coherence indicates the presence of the test signal in the ambient environment (indicating leakage past the acoustic barrier).

Other approaches such as frequency spectrum analysis and RMS levels can also be used to determine if the earpiece is sealed correctly. Using a non-difference comparison approach such as coherence or cross-correlation between the ASM and ECM signals to determine sealing is more reliable than taking the level difference of the ASM and ECM signals. Using the cross correlation rather than a level differencing approach improves the accuracy and minimizes errors which may occur due to user non-speech body noise, such as teeth chatter, sneezes, coughs, etcetera. Furthermore, such non-speech user generated noise would generate a larger sound level in the ear canal than on the outside of the same ear canal producing inaccurate results.

Figures 15A, 15B:
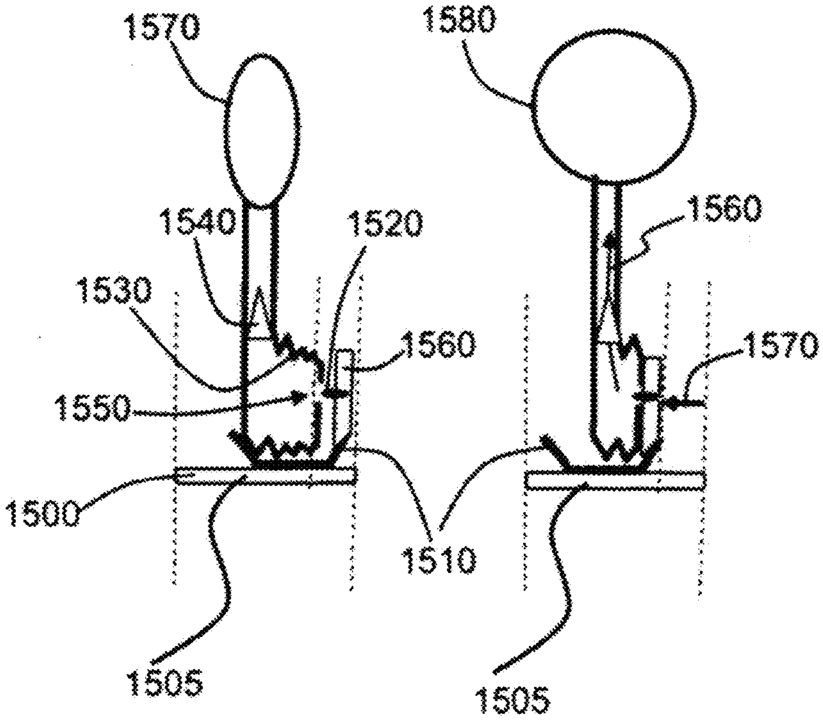
FIGS. 15A and 15B illustrate a method of varying the seal of an inflation system in accordance with at least one exemplary embodiment.

FIGS. 15A and 15B illustrate a method of varying the seal of an inflation system in accordance with at least one exemplary embodiment. In the non-limiting example, when a seal is essentially detected as being low, for example the calculated sound isolation of the system is 3 dB or less, a signal is sent to a seal varying device (e.g., 1500) to vary the seal, in this case increase (i.e. increase the sound isolation of the system) the seal value. The signal can be instructions to send a current over a period of time to an actuator, which can decrease the overall volume of the system (hence increasing the pressure and effectively the sealing). For example a slider actuator such as the P-653 PILine® can be used. Which has the dimensions of 15 mm by 11 mm by 8 mm, which includes an attached electronics control board, and has a mass of 1 gram. General operation uses 5V and about 100 mamps with a typical speed of 50 to 90 mm/sec. Note that the max force of about 0.15 N but such systems can be tailored to enable pumping beyond atmospheric pressure (e.g., can increase the max force). The non limiting example illustrated in FIGS. 15A and 15B shows a slider actuator 1500, with a moving slide 1510, having attached a pumping arm 1560, with a hole 1550 covering bump 1520. Upon receipt of a signal 1505 the actuator can move 1570 such that the bump 1520 covers the hole 1550 in a bellows 1530 pump. The actuation compresses the miniature bellows 1530 pushing 1590 gas through the one-way valve 1540, upon the back stroke the bump 1520 uncovers the hole 1550 and air rushes back into the bellows 1530 for the next pump. For example if the stroke length is 2 mm and the pump arm 1560 contact area is about 9 mm 2 then each stroke moves 18 mm 3 of volume. If an inflation system 1570 needs to be inflated more (e.g., more gas to increase sealing) then each stroke can provide an additional volume of gas of 18 mm 3 into the system increasing the inflation system 1580. If the inflation system is initially empty (e.g., needs 1000 mm 3 of gas volume to inflate) then about 56 strokes would be needed for inflation, which is about 110 mm one direction stroke length or about 2 seconds at P-653 PILine speeds. The number of oscillations and stroke length can be determined according to the signal 1505 sent, which can be specifically tailored depending upon the electronics controlling the actuators. Note that PI-653 is an example only. Other actuation systems can be used and controlled by signal 1505.

Figure 16:
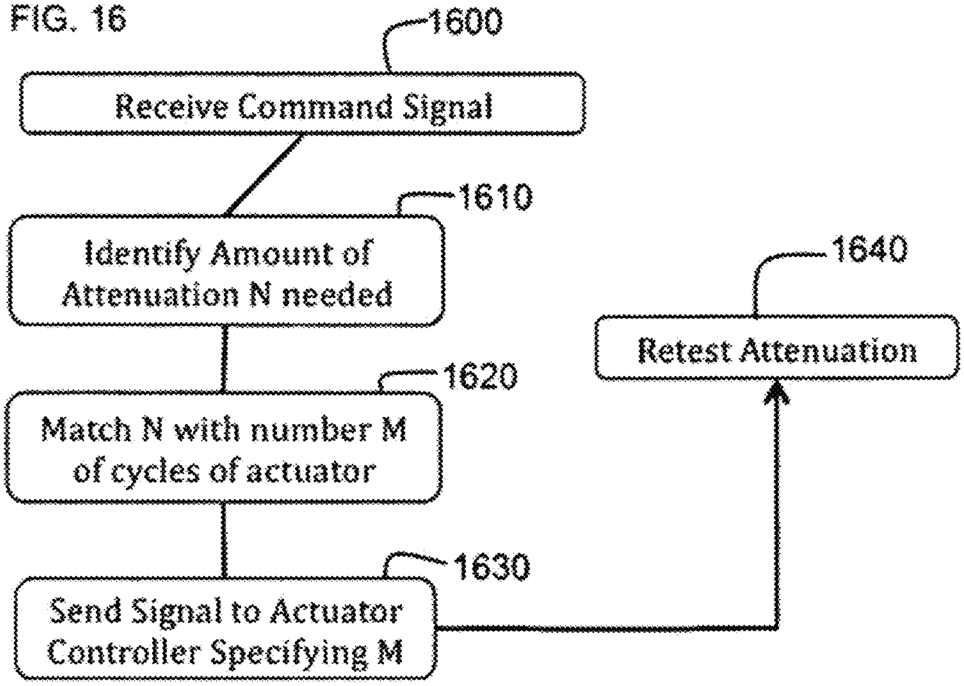
FIG. 16 illustrates the sending of a signal to an inflation controller upon detection of a seal fail to modify the seal pressure in accordance with at least one exemplary embodiment.

FIG. 16 illustrates a block diagram of controlled sealing in response to a seal fail signal and/or a request for increased seal attenuation. For example, a command signal 1600 is received (e.g., a seal fail signal in which a default attenuation value is attached for example 15 dB, or a signal requesting an additional amount of attenuation) by a processor. The command signal specifies an additional amount of attenuation or that the seal has failed. An attenuation needed N is identified 1610. For example if the current attenuation is 5 dB loss at f=500 Hz, at a pressure of 0.1 bar, and a command signal is received requesting a 10 dB loss at 500 Hz, then an experimental table is queried to find the pressure needed P which is then subtracted from the current pressure to obtain an increase in pressure DP needed. The increase in pressure is converted into a volume of gas increase needed (e.g., again referring to experimental tables based upon the inflation system volume). The volume of gas increase needed can then be directly linked with the number of cycles of an actuator pump M, 1620. The number of requested cycles M can then be sent 1630 to the actuator control circuit to pump the designated number of cycles. The system can then retest the attenuation 1640 and if refinements are needed the process can start again.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. For example, if words such as "orthogonal", "perpendicular" are used the intended meaning is "substantially orthogonal" and "substantially perpendicular" respectively. Additionally although specific numbers may be quoted in the claims, it is intended that a number close to the one stated is also within the intended scope, i.e. any stated number (e.g., 90 degrees) should be interpreted to be "about" the value of the stated number (e.g., about 90 degrees).

Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

The invention claimed is:

1. A device comprising:

a display;

a memory configured to store instructions; and a processor, wherein the processor is configured to execute the instructions to perform operations, the operations comprising:

generating a test signal or retrieving a test signal from memory;

sending the test signal to a speaker of an earpiece, wherein the earpiece includes a first microphone, the speaker, and a sealing section, wherein the earpiece is wirelessly connected to the device, and wherein the sealing section is configured to provide a level of sound attenuation between a first side of the earpiece and a second side of the earpiece when the earpiece is worn by a user;

receiving a first microphone signal from the first microphone, wherein at least a portion of the first microphone signal was measured while the test signal is played from the speaker;

applying a low pass filter to the first microphone signal to generate a filtered microphone signal, wherein the low pass filter includes a cutoff frequency below 200 Hz so that frequencies above the cutoff frequency are reduced in amplitude compared to amplitudes of the frequencies below the cutoff frequency;

calculating a value using the filtered microphone signal and a reference response, wherein the value is the result of a non phase calculation of at least one of a coherence of, a correlation of, a cross-correlation of, a difference of, or a combination thereof the filtered microphone signal and the reference response, wherein the value is not a ratio of intensities of the first microphone signal and the reference response;

comparing the value to a threshold to determine a seal quality between the first side and the second side of the earpiece;

generating a message to convey the seal quality; and sending the message to the user.

2. The device according to claim 1, wherein the message is a visual message sent to the display.

3. The device according to claim 1, wherein the speaker plays the test signal from the first side of the earpiece.

4. The device according to claim 3, wherein the first microphone measures sound from the first side.

5. The device according to claim 3, wherein the first microphone measures sound from the second side.

6. The device according to claim 1, wherein the test signal includes frequency components below the cutoff frequency.

7. The device according to claim 6, wherein the test signal includes only frequency components below the cutoff frequency.

8. The device according to claim 1, wherein the processor is part of the earpiece.

9. The device according to claim 1, wherein part of the operations is performed by a processor in the device and part of the operations is performed by a second processor in the earpiece.

10. The device according to claim 1, wherein the reference response is the test signal.

11. The device according to claim 1, wherein the test signal can be any audio content that includes a low frequency component below 200 Hz.

12. The device according to claim 1, wherein seal quality can be binary in nature, wherein the message includes the words of "good" or "poor" or synonyms thereof.

13. The device according to claim 1, wherein the seal quality is expressed in the message and can include at least one of the words "good", "bad", "fair", "poor", a combination thereof, or a synonym of at least one of the words.

14. The device according to claim 1, wherein the reference response is a spectral profile.

15. A device comprising:

a sealing section, wherein the sealing section is configured to provide a level of sound attenuation between a first volume and a second volume;

an ear canal microphone configured to generate an ear canal microphone signal, wherein the ear canal microphone measures sound from the first volume;

an ambient sound microphone configured to generate an ambient microphone signal, wherein the ambient sound microphone measures sound from the second volume;

a speaker configured to play sound into the first volume;

a memory configured to store instructions;

a processor, wherein the processor is configured to execute the instructions to perform operations, the operations comprising:

sending a test signal to the speaker;

receiving the ear canal microphone signal from the ear canal microphone, wherein at least a portion of the ear canal microphone signal was generated by measuring the sound from the first volume while the test signal is played from the speaker into the first volume;

applying a low pass filter to the ear canal microphone signal to generate a filtered microphone signal, wherein the low pass filter includes a cutoff frequency below 200 Hz so that frequencies above the cutoff frequency are reduced in amplitude compared to amplitudes of frequencies below the cutoff frequency;

calculating a value using the filtered microphone signal and a reference response, wherein the value is the result of a non phase calculation of at least one of a coherence, a correlation, a cross-correlation, a difference, or a combination thereof, and wherein the value is not a ratio of intensities of the filtered microphone signal and the reference response;

comparing the value to a threshold to determine a seal quality between the first volume and the second volume;

generating a message to convey the seal quality; and sending the message to the user.

16. The device according to claim 15, wherein the message is a visual message sent to the display of a device wirelessly connected to the earpiece.

17. The device according to claim 16, wherein part of the operations is performed by a processor in the device and part of the operations is performed by a processor in the earpiece.

18. The device according to claim 15, wherein the message is an audio message sent to the speaker of the earpiece.

19. The device according to claim 15, wherein the test signal includes only frequency components below the cutoff frequency.

20. The device according to claim 15, wherein the seal quality is expressed by the message and can include at least one of the words "good", "bad", "fair", "poor", a combination thereof, or a synonym of at least one of the words.

21. The device according to claim 15, wherein a cross correlation between the filtered microphone signal and the reference response is used to calculate the value, and wherein the threshold is between a cross correlation value of 0.25 and 0.9.

22. The device according to claim 21, wherein the threshold is between 0.6 and 0.85.

23. The device according to claim 15, wherein the sealing section is adjustable while the earpiece is worn by a user.

24. The device according to claim 23, wherein the sealing section is electrically adjustable.

25. The device according to claim 15, wherein the operations further include:

applying a high pass filter to either the ear canal microphone signal or the filtered microphone signal to generate a new filtered microphone signal, wherein the new filtered microphone signal is used in place of the filtered microphone signal in calculating the value, and wherein the lower cutoff frequency of the high pass filter is above 40 Hz and below 150 Hz.

26. The device according to claim 15, wherein the seal quality can be expressed as a binary result of a good seal or a poor seal.

27. The device according to claim 15, wherein the seal quality can be expressed as a binary result of a good seal or a poor seal.

28. The device according to claim 15, wherein the reference response is the test signal.

29. The device according to claim 15, wherein the reference response is a spectral profile.

30. The device according to claim 15, wherein the step of, comparing the value to a threshold to determine a seal quality, is performed by determining if the value is within the threshold of the reference response.

31. A device comprising:

a memory that stores instructions; and a processor, wherein the processor is configured to execute the instructions to perform operations, the operations comprising:

generating a test signal, wherein the test signal includes multiple frequency components, wherein at least one component lies between the range of 20 Hz and 400 Hz;

sending the test signal to a speaker of an earphone, wherein the earphone includes a first microphone, a second microphone, the speaker, wherein the earphone is configured to accept a sealing section and wherein the sealing section is configured to form an acoustic barrier between a first side of the earphone and a second side of the earphone when the earphone is worn by a user;

receiving a first microphone signal from the first microphone;

calculating a value, using a first signal and a second signal, wherein the value is the result of a non phase calculation of at least one of a coherence, or a correlation, or a cross-correlation, or a difference, or a combination thereof, wherein the second signal can be at least one of the test signal or a reference response or a combination thereof;

determining a seal of the earphone by comparing the value to a threshold to determine a seal quality between the first side and the second side, wherein a seal quality can have one or more values, wherein a value can be at least one of numerical or a word or a phrase or a combination thereof;

generating a message to convey the seal quality, wherein the message can include at least one of the words "good", or "bad", or "fair", or "poor", a combination thereof, or a synonym of at least one of the words; and sending the message to the user.

32. The device according to claim 31, wherein the reference response is the test signal, and wherein the test signal is at least one of a temporal signal or an average spectral profile or a combination thereof.

33. The device according to claim 31, wherein the first microphone is an ear canal microphone.

34. The device according to claim 31, wherein the step of, determining a seal of the earphone by comparing the value to a threshold, is performed by determining if the value is within the threshold of the reference response.

35. The device according to claim 31, wherein the processor is part of the earphone.

36. The device according to claim 31, wherein the processor is part of a phone, or a tablet, or a watch, or a computer.

* * * * *